(12) United States Patent
Baron et al.

(10) Patent No.: US 11,568,004 B2
(45) Date of Patent: Jan. 31, 2023

(54) COMPARATIVE SEARCH WITHIN USER-GENERATED CONTENT

(71) Applicant: Google LLC, Mountain View, CA (US)

(72) Inventors: Diego Baron, Miami, FL (US); Hillary Page Ive, San Carlos, CA (US); Rudi Anggono, Maplewood, NJ (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/946,981

(22) Filed: Jul. 14, 2020

(65) Prior Publication Data

US 2022/0019627 A1   Jan. 20, 2022

(51) Int. Cl.

| G06F 7/02 | (2006.01) |
|---|---|
| G06F 16/00 | (2019.01) |
| G06F 16/951 | (2019.01) |
| G06F 16/9538 | (2019.01) |
| G06Q 30/02 | (2012.01) |
| G06F 16/957 | (2019.01) |
| G06F 16/9535 | (2019.01) |

(52) U.S. Cl.
CPC ........ *G06F 16/951* (2019.01); *G06F 16/9535* (2019.01); *G06F 16/9538* (2019.01); *G06F 16/9577* (2019.01); *G06Q 30/0201* (2013.01)

(58) Field of Classification Search
CPC .............. G06F 16/951; G06F 16/9577; G06F 16/9535; G06F 16/9538; G06F 16/00; G06Q 30/0201
See application file for complete search history.

(56) References Cited

U.S. PATENT DOCUMENTS

| 8,321,300 B1 | 11/2012 | Bockius et al. |
|---|---|---|
| 8,666,853 B2 | 3/2014 | Bockius et al. |
| 8,700,621 B1 | 4/2014 | Choi et al. |
| 8,965,883 B2 | 2/2015 | Si et al. |
| 9,285,973 B1 * | 3/2016 | Gable ................ G06Q 30/0282 |
| 2009/0216577 A1 | 8/2009 | Killebrew |

(Continued)

OTHER PUBLICATIONS

Benedetti, Allesandro, "Exploring Solr Internals: the Lucene Inverted Index," from https://sease.io/2015/07/exploring-solr-internals-lucene.html Dec. 7, 2021 (Year: 2015).*

(Continued)

*Primary Examiner* — Bruce M Moser
(74) *Attorney, Agent, or Firm* — Brake Hughes Bellermann LLP

(57) ABSTRACT

According to an aspect, a method for searching within user-generated reviews includes receiving, from a client device, a search query to search within a plurality of user-generated reviews relating to a plurality of entities, and identifying, in response to the search query, a set of user-generated reviews from the plurality of user-generated reviews that correspond to one or more search terms of the search query, where the set of user-generated reviews includes a user-generated review for a first entity and a user-generated review for a second entity. The first entity is different from the second entity. The method includes providing at least a portion of the user-generated review for the first entity and at least a portion of the user-generated review for the second entity for simultaneous display on a comparison layout of a user interface of the client device.

22 Claims, 17 Drawing Sheets

(56) References Cited

U.S. PATENT DOCUMENTS

| | | |
|---|---|---|
| 2010/0306192 A1 | 12/2010 | Kapur et al. |
| 2014/0324805 A1 | 10/2014 | Agarwal et al. |
| 2015/0317395 A1* | 11/2015 | Arkin et al. |
| 2016/0205431 A1* | 7/2016 | Avedissian ......... G06Q 30/0261 725/37 |
| 2016/0343046 A1* | 11/2016 | Taguchi ............. G06Q 30/0282 |
| 2018/0293669 A1* | 10/2018 | Jackson et al. |

OTHER PUBLICATIONS

Marot, et al., "A New Way to Browse Hotels on Google", Oct. 31, 2018, 6 pages.

* cited by examiner

COMPARATIVE SEARCH WITHIN USER-GENERATED CONTENT

BACKGROUND

People often consult user-generated reviews when making purchase decisions such as choosing a hotel, restaurant, or product. In addition, to discover various options (e.g., find a hotel in a certain area, learn of restaurants nearby), users may use web search engines to search web content. Some web search engines display high-level information about reviews (overall rating score, number of ratings, etc.).

SUMMARY

Implementations include systems and methods for comparing and/or locating different entities (e.g., accommodations, restaurants, products, services, web pages, etc.) based on user-generated reviews. Some existing review search tools allow users to search within reviews for a single entity at once. However, the systems and methods discussed herein enable searching within user-generated reviews across multiple entities of a particular type and/or discovering or generating results based on user-generated reviews.

According to an aspect, a method for searching within user-generated reviews includes receiving, from a client device, a search query to search within a plurality of user-generated reviews relating to a plurality of entities, and identifying, in response to the search query, a set of user-generated reviews from the plurality of user-generated reviews that correspond to one or more search terms of the search query, where the set of user-generated reviews includes a user-generated review for a first entity and a user-generated review for a second entity. The first entity is different from the second entity. The method includes providing at least a portion of the user-generated review for the first entity and at least a portion of the user-generated review for the second entity for simultaneous display on a comparison layout of a user interface of the client device.

According to some aspects, the method may include one or more of the following features (or any combination thereof). The identifying step may include searching a review index associated with the plurality of user-generated reviews to identify the set of user-generated reviews. The plurality of user-generated reviews are indexed and searchable. The method may include obtaining a first snippet from the user-generated review for the first entity and obtaining a second snippet from the user-generated review for the second entity, where the first and second snippets are configured to be simultaneously displayed on the client device. The method may include providing the entire contents of the user-generated review for the first entity in response to receipt of a user-provided action taken with respect to the first snippet. The method may include generating a list of entities based on each entity's user-generated reviews relevance to the one or more search terms and providing portions of the user-generated reviews for the list of entities in the comparison layout on the user interface of the client device. The method may include receiving a second search query to search the plurality of user-generated reviews, where the second search query includes one or more search terms different from the one or more search terms of the search query, and obtaining, in response to the second search query, a new set of user-generated reviews from the plurality of user-generated reviews that correspond to the one or more search terms of the second search query, where the new set of user-generated reviews includes reviews about new entities, and providing portions of the new set of user-generated reviews on the user interface such that the comparison layout is repopulated with the new entities along with portions from the new set of user-generated reviews that correspond to the one or more search terms of the second search query. The method may include receiving receipt of a user-provided action taken with respect to a selectable keyword included within the user-generated review for the first entity, obtaining a new set of user-generated reviews from the plurality of user-generated reviews that correspond to the selectable keyword, where the new set of user-generated reviews includes reviews about new entities, and providing portions of the new set of user-generated reviews on the user interface such that the comparison layout is repopulated with the new entities along with portions of the new set of user-generated reviews that correspond to the selectable keyword. The method may include receiving receipt of a user-provided action taken with respect to the second entity to remove the second entity from the comparison layout, identifying, in response to the receipt of the user-provided action, a third entity as a suggested option, and providing, in replacement of the second entity, at least a portion of a user-generated review for the third entity as the suggested option for display on the comparison layout.

According to an aspect, a method for searching within user-generated reviews for multiple entities includes receiving, from a client device, a search query to search within a plurality of user-generated reviews relating to a plurality of entities, the search query including one or more search terms, identifying, in response to the search query, a set of user-generated reviews from the plurality of user-generated reviews that correspond to the one or more search terms of the search query, and generating a list of entities based on the set of user-generated reviews, where the list of entities includes a first entity and a second entity. The second entity is different from the first entity. The method includes providing the list of entities for display on a user interface of a client device.

According to some aspects, the method may include one or more of the following features (or any combination thereof). The search query is a filter on a search of entities. The identifying step includes searching a review index associated with the plurality of user-generated reviews to identify the set of user-generated reviews. The method may include ranking the list of entities based on each entity's user-generated reviews relevance to the one or more search terms included within the search query. The set of user-generated reviews may include first user-generated reviews for the first entity and second user-generated reviews for the second entity. The method may include providing snippets of the first user-generated reviews and for the second user-generated reviews for simultaneous display on a comparison layout of the user interface of the client device. The method may include receiving receipt of a user-provided action taken with respect to a selectable keyword included within one of the snippets, obtaining a new set of user-generated reviews from the plurality of user-generated reviews that correspond to the selectable keyword, where the new set of user-generated reviews includes reviews about a new list of entities, and providing snippets of the new set of user-generated reviews on the user interface such that the comparison layout is updated with the new list of entities along with the snippets of the new set of user-generated reviews that correspond to the selectable keyword.

According to an aspect, a method for searching within user-generated reviews for multiple entities includes receiving a primary search query to search of corpus of entities, obtaining, in response to the primary search query, a search result including a list of entities that are responsive to the primary search query, receiving a secondary search query to search a plurality of user-generated reviews for the list of entities such that the secondary search query functions as a filter on the search result, identifying a set of user-generated reviews associated with the list of entities from the plurality of user-generated reviews, generating a filtered list of entities based on the set of user-generated reviews, where the filtered list of entities includes a first entity and a second entity and the second entity is different from the first entity, and providing the filtered list of entities for display on a user interface of a client device.

According to some aspects, the method may include one or more of the following features (or any combination thereof). The plurality of user-generated reviews are indexed and searchable. The set of user-generated reviews includes first user-generated reviews for the first entity and second user-generated reviews for the second entity. The method may include providing snippets of the first user-generated reviews and for the second user-generated reviews for simultaneous display on a comparison layout of the user interface of the client device. The method may include receiving receipt of a user-provided action taken with respect to a selectable keyword included within one of the snippets, obtaining a new set of user-generated reviews from the plurality of user-generated reviews that correspond to the selectable keyword, where the new set of user-generated reviews includes reviews about a new list of entities, and providing snippets of the new set of user-generated reviews on the user interface such that the comparison layout is updated with the new list of entities along with the snippets of the new set of user-generated reviews that correspond to the selectable keyword. The identifying step includes searching a review index associated with the plurality of user-generated reviews to obtain the set of user-generated reviews.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1A:
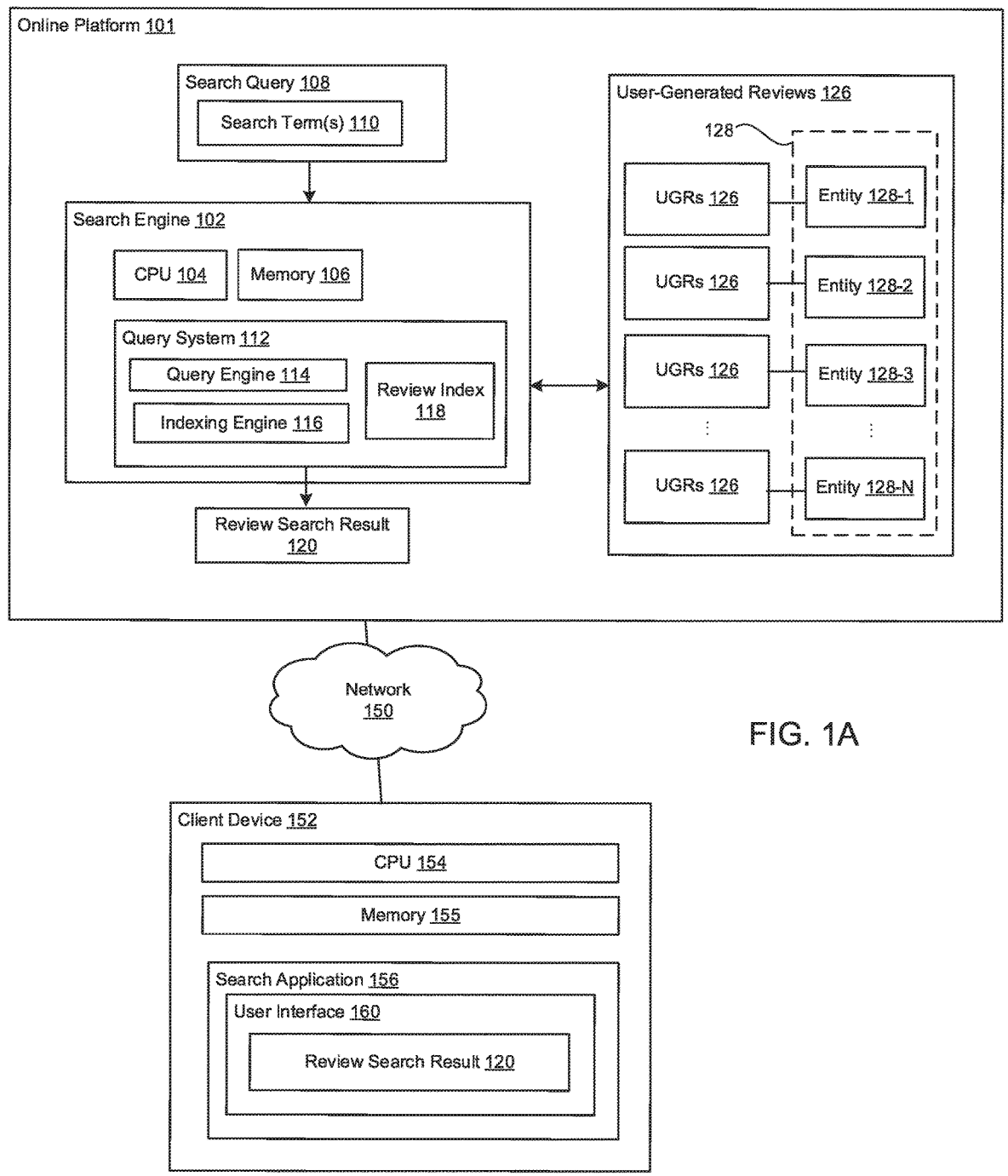
FIG. 1A illustrates a search system for searching within user-generated reviews according to an aspect.

A user may search a corpus of entities (e.g., a product catalog, a service product catalog, webpages, etc.) to obtain a list of entities responsive to a primary search query. For example, a user may search a database of products for "display monitor" and then receive a list of display monitors, or the user may perform a web search for "hotels in Milwaukee" and then receive a list of different hotels in Milwaukee. In some examples, the user is able to filter the search result of the primary search query based on keyword searching within the user-generated reviews to obtain a review search result, which may include a filtered list of entities and/or relevant portions of user-generated reviews that correspond to the search term(s) of the filter. For example, the user can submit a secondary search query to search for "lake view" within the user-generated reviews across the list of entities (which was the result of the primary search query), and then receive a list of hotels (e.g., a filtered list) whose user-generated reviews are responsive to the search criteria "lake view."

In some examples, a user can select which entities to compare, and then submit a keyword search to search the user-generated reviews for the entities selected by the user. For example, the user may view a product list or a service product list, and then select which entities from that list to search within the user-generated reviews. Also, the user may perform one or more searches within the corpus of entities, and then select which entities to compare based on the results of those searches. With respect to the hotel example, a user may select five hotels in the Milwaukee area, and then search the user-generated reviews across the five hotels according to any type of search criteria (e.g., beaches, bed bugs, pools, etc.).

In some examples, in response to the user-generated reviews being searched within the context of a primary search query or a secondary search query, the search engine may rank the list of entities based on each entity's user-generated reviews relevance to the search term. For example, a user may submit a search query such as "lake view" and the search engine may search the user-generated reviews for the search criteria "lake view" and identify the user-generated reviews that contain the search criteria "lake view." The search engine may identify which entities correspond to the user-generated reviews that contain the search criteria "lake view." In some examples, the search engine may rank the identified entities based on the entity's user-generated reviews relevance to the search term(s). In some examples, the ranking may be based on the occurrence of the search term(s) within a respective entity's user-generated reviews. For example, if the occurrence of the term "lake view" in the user-generated reviews pertaining to the first entity is relatively high, the first entity may be ranked higher than other entities. In some examples, the search engine may rank the identified entities based on other signals related to the user-generated reviews such as helpfulness, review quality, review length, and/or the time associated when the user-generated reviews were posted.

In some examples, the review search results can be provided in a comparison layout that identifies user-generated reviews for multiple entities that correspond to the search term(s). In other words, a user can search within and compare user-generated reviews for several entities at once. A user may submit a query (e.g., "pools"), and a search engine obtains user-generated reviews for multiple entities (e.g., hotel A, hotel B, hotel C, etc.) that meet the search criteria. As indicated above, hotel A, hotel B, and hotel C may be selected by the user or these hotels may be identified from a previous search. The search engine may provide these user-generated reviews (or portions thereof) in a comparison layout so that the user can compare the entities in a single place/page (e.g., without having to switch between tabs). Using the above example, user-generated reviews pertinent to "pools" for multiple different hotels are identified and displayed in a manner that allows the user to compare different hotels. However, it is noted that the criteria for evaluating different hotels may widely vary from user to user, where some users may want to search user-generated reviews for bed cleanliness or whether a hotel has a restaurant that has vegan options. The techniques described herein enable searching within user-generated reviews across multiple different entities according to any type of search criteria and then displaying the comparison results in a single place/place to help the user decide between different options. Thus, implementations provide a novel way to search for entities, which uses user-generated content as a primary way to surface entities and as a way to filter entities responsive to a primary query.

In some examples, the comparison layout may include a first column that corresponds to a first entity (e.g., a first hotel) and a second column that corresponds to a second entity (e.g., a second hotel), where the first column is populated with user-generated reviews (or portions thereof) about the first entity that meet the search criteria, and the second column is populated with user-generated reviews (or portions thereof) about the second entity that meet the search criteria. However, the embodiments encompass any type of comparison layout that allows users to compare user-generated reviews across multiple entities. In addition, the comparison layout may include any number of entities to be compared such as three entities, four entities, five entities, or any number greater than five. The user may submit another search, which repopulates the list of entities within the comparison layout with the user-generated reviews (or portions thereof) that meet the new search criteria.

In some examples, the user enters text into a search box to submit a query. In some examples, one or more keywords or phrases (or most (or all) of the words) of the displayed user-generated review portions are selectable, which, when selected, can cause submission of another query to search the user-generated reviews. For example, users can click on keywords within the reviews to repopulate the comparison layout with a new list of entities having user-generated reviews related to whichever word is clicked (e.g., all or some of the words within a review can function like pivot/search-chips), so the user does not have to type a new query. In some examples, the user can remove/eliminate one or more entities from the comparison layout that they are no longer interested in seeing. In some examples, when an entity is removed from the comparison layout, an alternative entity may be suggested to the user and take the previous entity's place.

In some examples, the comparison layout is populated with snippets (e.g., portions of the user-generated reviews) that include the search term. For example, the search engine may obtain only relevant snippets from the user-generated reviews so users can see many reviews at once, and they do not have to sift through a long review to find the relevant sentence. In some examples, only the relevant portion is surfaced, and users may click to see the full review. In further detail, the first column may include snippets of user-generated reviews that correspond to the first entity, and the second column may include snippets of user-generated reviews that correspond to the second entity. In this manner, for a single entity, users will have the ability to see several short, on-topic sentences pertinent to their search query. Also, users will have the ability to quickly compare the relevant review snippets related to the first entity to relevant review snippets related to other entities to assist the user with deciding between the various entities. In some implementations, users can access the full review by either expanding in-line or going to a different page. For example, in response to a user-provided action taken with respect to a snippet of a user-generated review (e.g., the user clicks on the snippet or a user interface element associated with the snippet), the entire contents of the user-generated review is displayed. In some examples, snippets are not created, but rather the entire contents of the user-generated review are displayed in the comparison layout.

Implementations include systems and methods that enable searching web pages and generating a search result to be displayed as a ranked list of web pages in which one or more of the ranking signals are derived from the user-generated reviews. A query system may identify the entities associated with web pages determined to be responsive to a query. For example, if the ranked list of web pages identifies a first web page corresponding to a first hotel, a second web page corresponding to a second hotel, and a third web page corresponding to a third hotel, the query system may identify the first hotel, the second hotel, and the third hotel as the entities associated with the responsive items. Then, the query system may obtain the user-generated reviews associated with the identified entities. The query system may derive one or more ranking signals from the user-generated reviews. For example, the query system may obtain rating scores associated with the relevant user-generated reviews and/or analyze the content of the user-generated reviews to provide one or more signals indicating a level of user impression of the underlying entity. In addition, the ranking signals related to the user-generated reviews may include signals related to helpfulness, review quality, review length, and/or the time associated when the user-generated reviews were posted. Based on the ranking signal(s) associated with the user-generated reviews (in conjunction with other types of ranking signals), the query system may rank the list of web pages to generate the ranked list.

FIGS. 1A through 1H illustrate a search system 100 that implements a search service to search within user-generated reviews 126 across multiple entities 128 according to an aspect. The search system 100 enables searching within user-generated reviews 126 across multiple entities 128 of a particular type. The search system 100 includes an online platform 101 in which users (using a client device 152) can submit user-generated reviews 126 about various entities 128 associated with the online platform 101.

An entity 128 may refer to an item that can be reviewed by a particular user. In some examples, the entities 128 may include accommodations, restaurants, products, and/or services. In some examples, the entities 128 may include web pages. Entities 128 of a particular type may refer to entities 128 within a certain category (e.g., hotels, restaurants, car rental companies, etc.). In some examples, the entities 128 may include persons (e.g., groups of people, political candidates, celebrities, etc.) or locations (e.g., geographical locations, structures, places of interest, etc.). In some examples, the entities 128 may include opinions and/or ideas. Generally, the entities 128 may represent any item capable of being reviewed by a user. The search system 100 may be used to filter and/or rank entities based on user-generated reviews 126. For instance, a user may build an itinerary of things to do based on reviews from other travelers. For example, an English soccer fan visiting New York could search for user-generated reviews 126 that mention "Premier League" or "English breakfast," which may facilitate surfacing establishments liked by other English soccer fans. Other examples include shopping, e.g., searching for inspirations, searching for comparisons or narrowing down the choices based on what other shoppers say in the user-generated reviews 126. Other examples include searching and comparing what people say about a certain topic, e.g., comparing policies from different politicians on an issue, comparing schools based on what parents and educators say in user-generated reviews 126, comparing health care options, doctors, etc.

In some examples, the user-generated reviews 126 are stored in a product catalog and/or a service product catalog. In some examples, the user-generated reviews 126 are stored in a database associated with the online platform 101. In some examples, the user-generated reviews 126 are stored in a collection of databases.

In some examples, the user-generated reviews 126 are indexed and searchable. In some examples, the user-generated reviews 126 are not necessarily stored within a traditional database, but rather can be stored as a synthetic corpus of web documents that are indexed and searchable (e.g., similar to the way web pages are indexed and searchable by a web browser). For example, in response to a user posting a user-generated review 126 to the online platform 101, the user-generated review 126 may be stored as a web document, and a review index 118 is updated by an indexing engine 116 to add the user-generated review 126 to the review index 118.

Providing user-generated reviews 126 that are indexed and searchable may overcome technical challenges that are not typically encountered when indexing and understanding web pages. In some examples, the online platform 101 may incorporate techniques that provide increased semantic understanding of the underlying text to understand colloquial speech since reviews sometimes can be less well written than web pages. Also, a review may be relatively short as compared to a web page, and, therefore, a review may have less text to develop the semantic understanding (e.g., what about this particular item or hotel is the review referring to and what is the sentiment being expressed). For web pages, in terms of trustworthiness, there may be signals reflecting user behavior and signals that use the trustworthiness of other links to inform popularity and trust. However, since determining trustworthiness for reviews can be difficult, in some examples, the online platform 101 may utilize a variety of signals (e.g., signals about the underlying user and/or the particular review) to determine the quality of a particular review.

In response to a search query 108, the review index 118 can be quickly searched to identify the user-generated reviews 126 that correspond to one or more search term(s) 110 of the search query 108. The corpus of user-generated reviews 126 include user-generated reviews 126 for a plurality of entities 128. For example, the user-generated reviews 126 include one or more user-generated reviews 126 for a first entity 128-1, one or more user-generated reviews 126 for a second entity 128-2, and one or more user-generated reviews 126 for a third entity 128-3 through an N entity 128-N. However, unlike some conventional search tools, the search system 100 may enable searching within the user-generated reviews 126 across multiple entities 128 of a particular type. In other words, disclosed implementations enable the user-generated reviews 126 to determine which entities 128 are responsive to a search query 108.

A user-generated review 126 may include any type of content that has been submitted to the online platform 101 by a user about a particular entity 128. In some examples, a user-generated review 126 refers to any type of user-generated content (UGC). In some examples, a user-generated review 126 can include any publicly accessible information generated by humans. In some examples, the user is a person that submits a review about his/her experiences associated with the entity 128. In some examples, the user-generated reviews 126 include editorial reviews and/or professional reviews. In some examples, the user-generated reviews 126 include social media comments and posts (e.g., comments and posts that are made public). In some examples, when searching within the user-generated reviews 126, the user-generated reviews 126 include social media posts from users connected to the user in a connection graph (e.g., are following or friends of the user). In some examples, a user-generated review 126 includes a description (e.g., text) of a particular user's experience, thoughts, and/or impressions about a particular entity 128. In some examples, a user-generated review 126 includes a rating or a score provided by the user. In some examples, the user-generated review 126 includes an image and/or video about the entity 128 or related to the user's experience about the entity 128. In some examples, the user-generated reviews 126 include video reviews in which users' post to the online platform 101 about the underlying entity 128. For example, a user may create and submit a video about the entity 128. The video may be provided along with text and/or an image. In some examples, users can record an audio (or a video) of themselves or record an audio (or a video) related to the particular entity 128 (e.g., the ambiance of the hotel, the sounds of the restaurant downstairs, the sounds of the hallways, the sounds of the elevator, the sounds of creaking floors), and those can be searchable and compiled. In some examples, a user-generated review 126 may include ideograms or smileys (e.g., emojis) or other user-inserted or created content.

In some examples, in order to submit a user-generated review 126, the user locates an entity 128 (e.g., a hotel, product, business, etc.) on the online platform 101. The user may select a user interface element to create a review about the entity 128. Then, the user submits the review (e.g., the user-generated review 126) to the online platform 101 so that other users of the online platform 101 can see what the person has posted about the entity 128. In some examples, the online platform 101 includes a website or a collection of websites. In some examples, the online platform 101 includes one or more web services. In some examples, the online platform 101 includes a website or web service that identifies various entities 128 for review, comparison, and/or purchase. For example, the online platform 101 may be a website or web service that allows users to search and identify hotels and submit user-generated reviews 126 about the different hotels. However, the online platform 101 may be associated with any type of entity 128 (e.g., besides hotels) or multiple different types of entities 128. In some examples, the online platform 101 is associated with multiple services such as web searching, email, data storage that are in addition to the user-generated reviews 126.

The online platform 101 includes a search engine 102 configured to receive a search query 108 from a client device 152 (e.g., a requestor) to search the user-generated reviews 126. The search query 108 may specify one or more search terms 110 identified by a user. In response to the search query 108, the search engine 102 obtains a review search result 120. For example, the search engine 102 obtains the review search result 120 by searching the review index 118 associated with the user-generated reviews 126. The review search result 120 is then returned to the client device 152. In some examples, the review search result 120 is provided in a comparison layout 162 as shown with respect to FIGS. 1B through 1D. In some examples, the review search result 120 is provided as a list of entities (or ranked list of entities) whose user-generated reviews 126 correspond to the search term(s) 110 of the search query 108. In some examples, the review search result 120 is provided as a filtered list of entities (or ranked (and filtered) list of entities) whose user-generated reviews 126 correspond to the search term(s) 110 of the search query 108. In some examples, the list of entities is provided in the comparison layout 162 along with the relevant portions of the user-generated reviews 126. These aspects are further explained later in the disclosure.

Figure 9:
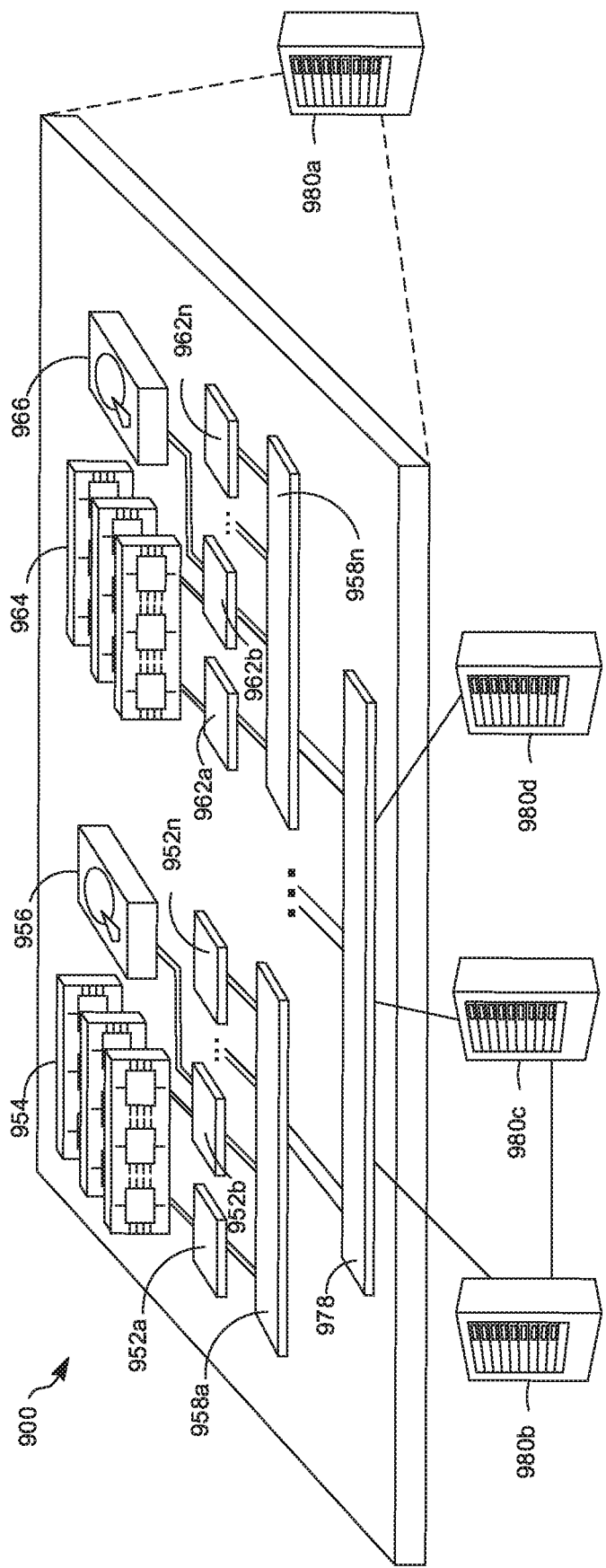
FIG. 9 shows an example of a distributed computer device that can be used to implement the described techniques.

The search engine 102 may be computing devices that take the form of a number of different devices, for example a standard server, a group of such servers, or a rack server system. In some examples, the search engine 102 may be a single system sharing components such as processors and memories. In addition, the search engine 102 may be implemented in a personal computer, for example a laptop computer. The search engine 102 may be an example of computer device 900, as depicted in FIG. 9. The search engine 102 may include one or more servers that receive queries (e.g., query 108) from a requestor, such as client device 152, and provide search results (e.g., search result 120) to the requestor.

The search engine 102 may include one or more processors 104 formed in a substrate, an operating system (not shown) and one or more computer memories 106. The computer memories 106 may represent any kind of memory (e.g., RAM, flash, cache, disk, tape, etc.). The memory 106 may represent multiple kinds of memory. In some examples (not shown), the memory 106 may include external storage, e.g., memory physically remote from but accessible by the search engine 102. The search engine 102 may include one or more modules or engines representing specially programmed software. For example, the search engine 102 may include a query system 112 that enables the search engine 102 to receive and respond to queries.

The query system 112 may include a query engine 114 and an indexing engine 116. The indexing engine 116 may update a review index 118 relating to the user-generated reviews 126. For example, the indexing engine 116 may index the user-generated reviews 126 to generate and/or update the review index 118 so that a search query 108 can be processed relatively quickly. The indexing engine 116 may add reviews to the review index 118, update reviews in the review index 118 and delete reviews from the review index 118. For example, after a user submits a user-generated review 126, the indexing engine 116 may add that review to the review index 118.

The review index 118 may include a web document index, e.g., an inverted index that associates terms, phrases, and/or n-grams with web documents. Web documents can be any user-generated reviews 126 submitted to the online platform 101 and accessible over the Internet. In some examples, the indexing engine 116 may work with one or more crawlers. A crawler searches for user-generated reviews 126 accessible via the Internet and returns content (including metadata) for the user-generated reviews 126. In some implementations, the user-generated reviews 126 are part of the online platform 101 and accessible to the indexing engine 116 without a crawler. The indexing engine 116 may use the content and/or metadata to generate and update the review index 118. The review index 118 may be stored on a tangible computer-readable storage device, for instance disk, flash, cache memory, or a combination of these, configured to store data in a semi-permanent or non-transient form. In some examples, the review index 118 may be stored in a combination of various memories.

The query engine 114 may receive search queries 108 from requestors, such as the client device 152, analyze the search queries 108 to determine how to search the review index 118, and to initiate the search of the review index 118. A user may submit a search query 108, e.g., a word, a phrase, a list of words, etc. to the search engine 102. The search engine 102, specifically the query engine 114, uses the review index 118 to identify the items that are returned in response to the search query 108.

The query system 112 may be in communication with client device(s) 152 over a network 150. Network 150 may be for example, the Internet, a cellular network, a wired or wireless local area network (LAN), wide area network (WAN), etc. The network 150 may represent multiple types of networks. Via the network 150, the query system 112 may communicate with and transmit data to/from client devices 152.

Figure 8:
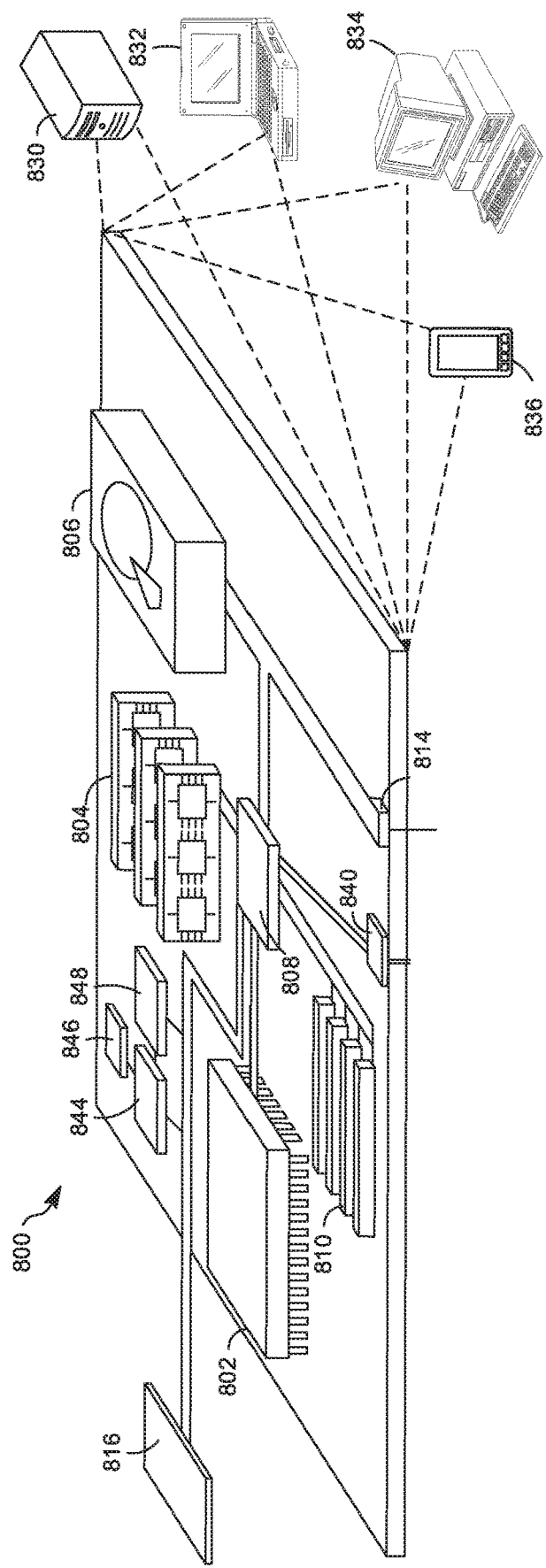
FIG. 8 shows an example of a computer device that can be used to implement the described techniques.

The client device 152 may be an example of computer device 800, as depicted in FIG. 8. For example, the client device 152 may be a personal computer, a mobile phone, a tablet, a laptop, a wearable device, a smart television, or the like. The client device 152 may include one or more processors 154 formed in a substrate configured to execute one or more machine executable instructions or pieces of software, firmware, or a combination thereof. The processors 154 can be semiconductor-based—that is, the processors can include semiconductor material that can perform digital logic. The client device 152 can also include one or more computer memories 155. The memories 155, for example, a main memory, may be configured to store one or more pieces of data, either temporarily, permanently, semi-permanently, or a combination thereof. The memories 155 may include any type of storage device that stores information in a format that can be read and/or executed by the one or more processors 154. The memories 155 may store applications, modules and/or engines that, when executed by the one or more processors 154, perform certain operations. In some implementations, the applications, modules, or engines, may be stored in an external storage device and loaded into the memory 155.

The applications may include any number of applications configured to execute on the client device 152, such as an operating system, a messaging application, shopping applications, editing applications, search assistants, maps, etc. In particular, the applications include a search application 156. In some examples, the search application 156 may be a browser application that is operable to receive web page code (e.g., HTML, JavaScript, etc.) and render the web page for presentation to a user of the client device 152. In some examples, the search application 156 may be operable to search a specific corpus, e.g., items offered for sale, properties for rent, restaurants, etc. In some examples, the search application 156 can display a map with a list of entities 128, where the search application 156 can identify one or more review search results 120 on the map.

The client device 152 may include one or more input devices, such as touch screen, keyboard, mouse, pointer, a microphone, a camera, one or more physical buttons, etc. The input devices may initiate input events, such as scrolling, link selection, cursor movement, which can be received and analyzed by the search application 156. The client device 152 may also include communications devices operable to send and receive data from other computing devices, such as another client, servers, search engine 102, etc., over one or more networks, such as network 150.

Figure 1B:
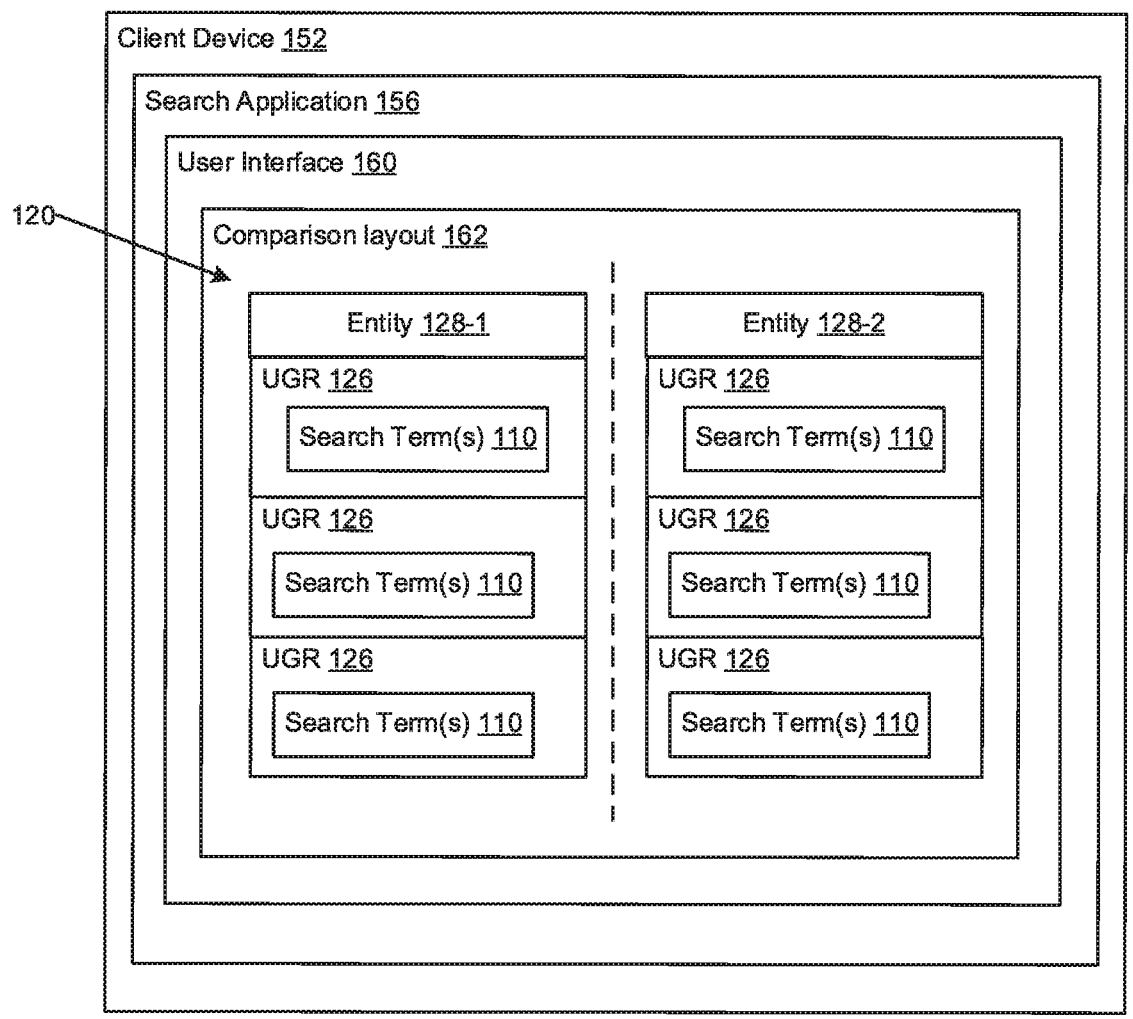
FIG. 1B illustrates a comparison layout populated with user-generated reviews across multiple entities according to an aspect.
Figure 1C:
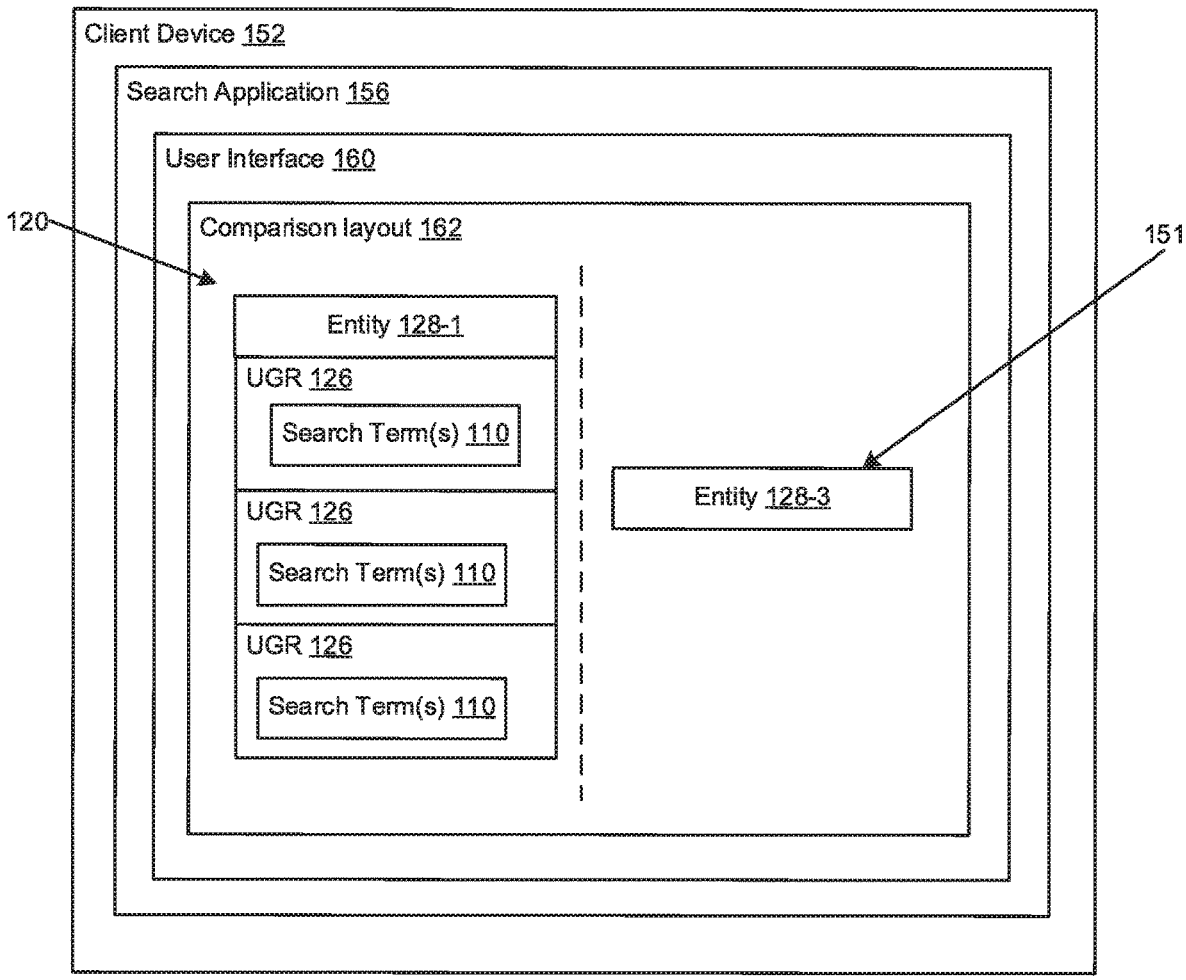
FIG. 1C illustrates a comparison layout that provides a suggested entity on the comparison layout according to an aspect.

In some examples, as shown in FIG. 1B, the review search result 120 identifies or includes a set of user-generated reviews 126, where each user-generated review 126 includes content that is responsive to the search term(s) 110 specified by the search query 108. For example, the query engine 114 may receive the search term(s) 110 specified by the search query 108 and obtain the relevant user-generated reviews 126 by searching the review index 118. In some examples, the review search result 120 includes video reviews (or links to the video reviews). For example, the search engine 102 may obtain (or search) transcriptions of the video reviews, and, if the transcriptions include the search term(s) 110, those video results are identified. In some examples, the review search result 120 includes images (or photos) that are responsive to the search term(s) 110. For example, the search engine 102 may employ one or more image recognition comparison tools to search within the images (or photos) of the user-generated reviews (e.g., a search within photos for "golden retriever" to see the UGR photos of golden retrievers).

In some examples, the search engine 102 provides these user-generated reviews 126 (or portions thereof) in a comparison layout 162 on the user interface 160 of the client device 152 so that the user can compare the entities 128 in a single place/page (e.g., without having to switch between tabs). The comparison layout 162 may be a user interface design that is populated with user-generated reviews 126 (or portions thereof) for multiple entities 128 in a manner that allows the user to compare the relevant user-generated reviews 126 for multiple entities 128. As shown in FIG. 1B, the comparison layout 162 includes user-generated reviews 126 (or portions thereof) for a first entity 128-1 and user-generated reviews 126 (or portion thereof) for a second entity 128-2, where the user-generated reviews 126 relate to one or more search terms 110 of the search query 108. In some examples, the comparison layout 162 includes a column grid layout of entities 128 (e.g., side by side), which allows users to compare the entities 128 in a single place/page (rather than having to switch between tabs, for example). Users can issue a query with another term, thereby repopulating the list of hotels based on the user-generated reviews 126 that are responsive to the new query.

In some examples, the comparison layout 162 is populated with snippets (e.g., portions of the user-generated reviews 126) that relate to the search term(s) 110). For example, the query engine 114 may obtain relevant snippets from the user-generated reviews 126 so users can see many reviews at once without having to sift through a long review to find the relevant sentence. In some examples, only the relevant portion is surfaced, and users may click to see the full review. In further detail, the group of user-generated reviews 126 relating to the first entity 128-1 may include snippets of user-generated reviews 126 that correspond to the first entity 128-1, and the group of user-generated reviews 126 relating to the second entity 128-2 may include snippets of user-generated reviews 126 that correspond to the second entity 128-2. In this manner, for a single entity, users will have the ability to see several short, on-topic sentences pertinent to their search query 108.

Also, the user will have the ability to quickly compare the relevant portions of the first entity 128-1 to relevant portions of the second entity 128-2 to assist the user in comparing the various entities 128. In some examples, users can access the full review by either expanding a review snippet in-line or by linking to a different page. For example, in response to a user-provided action taken with respect to a snippet of a user-generated review 126 (e.g., the user clicks on the snippet), the entire contents of the user-generated review 126 is displayed. In some examples, snippets are not created, but rather the entire contents of the user-generated review 126 are displayed in the comparison layout 162.

In some examples, the user may select the list of entities 128 used in populating the comparison layout 162. In a hotel example, the user may select five hotels for comparison and then submit a search query 108 (e.g., "bed bugs"), resulting in population of the comparison layout 162 with the user-generated reviews 126 (or snippets) that pertain to the search query 108 across the five selected hotels. If no user reviews are responsive to the search query 108, the search system 100 may indicate in the comparison layout 162 that no such reviews were found.

Figure 1D:
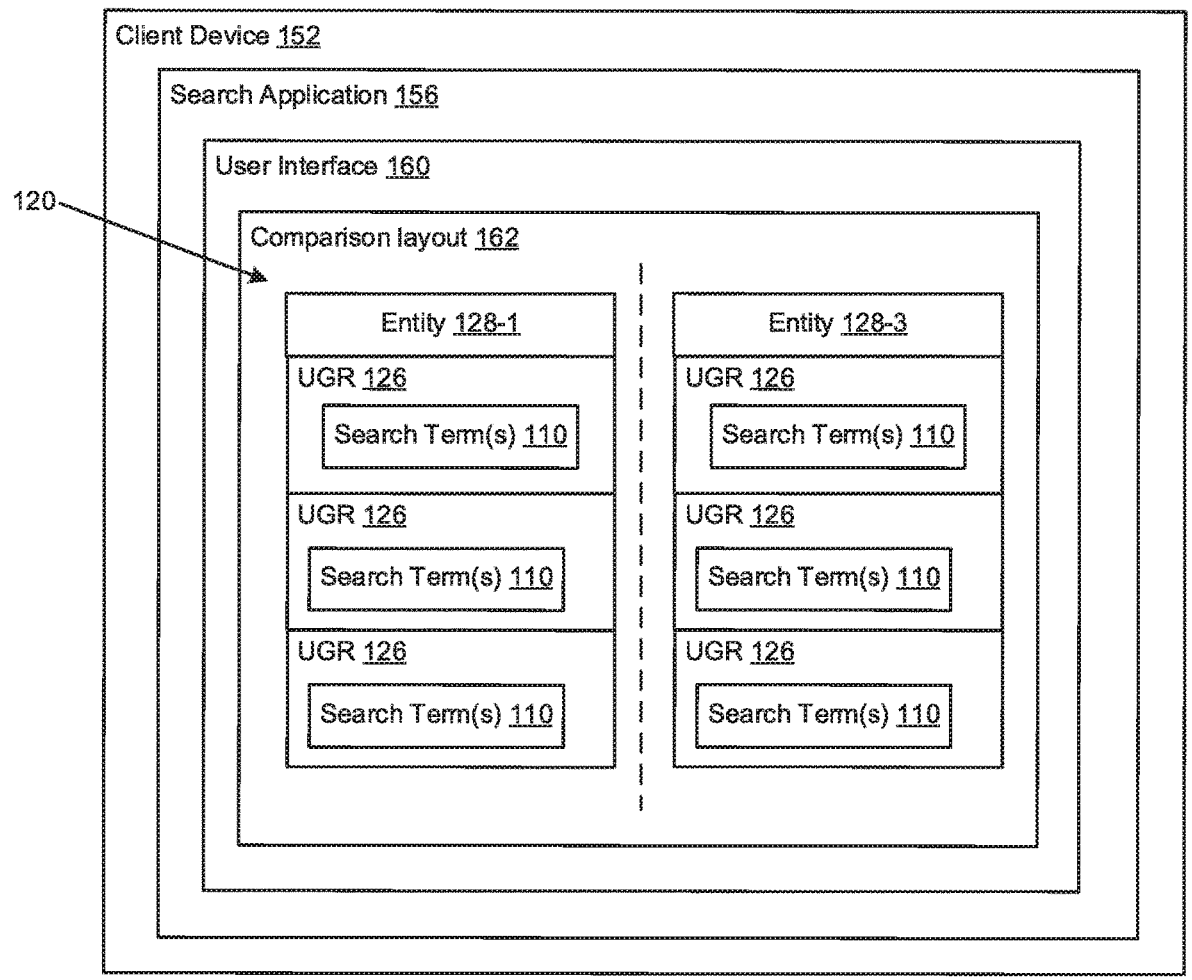
FIG. 1D illustrates a comparison layout populated with user-generated reviews from the suggested entity according to an aspect.

In some examples, as further explained with respect to FIGS. 1E through 1H, the user can use the user-generated reviews 126 to filter the results of a primary search. For example, a user may search a corpus of entities 128 (e.g., a product catalog, a service product catalog, webpages, etc.) to obtain a list 121 of entities 128 responsive to a primary query (e.g., search query 108A). For example, a user may search a database of products for "display monitor" and then receive a list 121 of display monitors, or the user may perform a web search for "hotels in Milwaukee" and then receive a list 121 of different hotels in Milwaukee. In some examples, the user is able to filter the search result 120A of the search query 108A based on keyword searching within the user-generated reviews 126 to obtain the review search result 120. For example, the user can submit a search query 108B to search for "bed bugs" within the user-generated reviews 126 across the list 121 (which was the result of the search query 108A), and then receive a list of hotels (e.g., a filtered list) whose user-generated reviews 126 are responsive to the search criteria "bed bugs." The filtered list 123 and the relevant portions of the user-generated reviews 126 may be populated within the comparison layout 162, In some examples, the user can remove/eliminate one or more entities 128 from the comparison layout 162. In some examples, when an entity 128 is removed from the comparison layout 162, an alternative entity 128 may be suggested to the user and take the previous entity's place. For example, referring to FIG. 1C, the user has removed the second entity 128-2. In some examples, in response to the removal of the second entity 128-2, the search engine 102 may identify a suggested entity 151 (e.g., entity 128-3) to take the place of the removed second entity 128-2. Then, if the user selects the suggested entity 151, as shown in FIG. 1D, the search engine 102 may populate the comparison layout 162 with the third entity's user-generated reviews 126 pertaining to the search terms(s) 110.

Figure 1E:
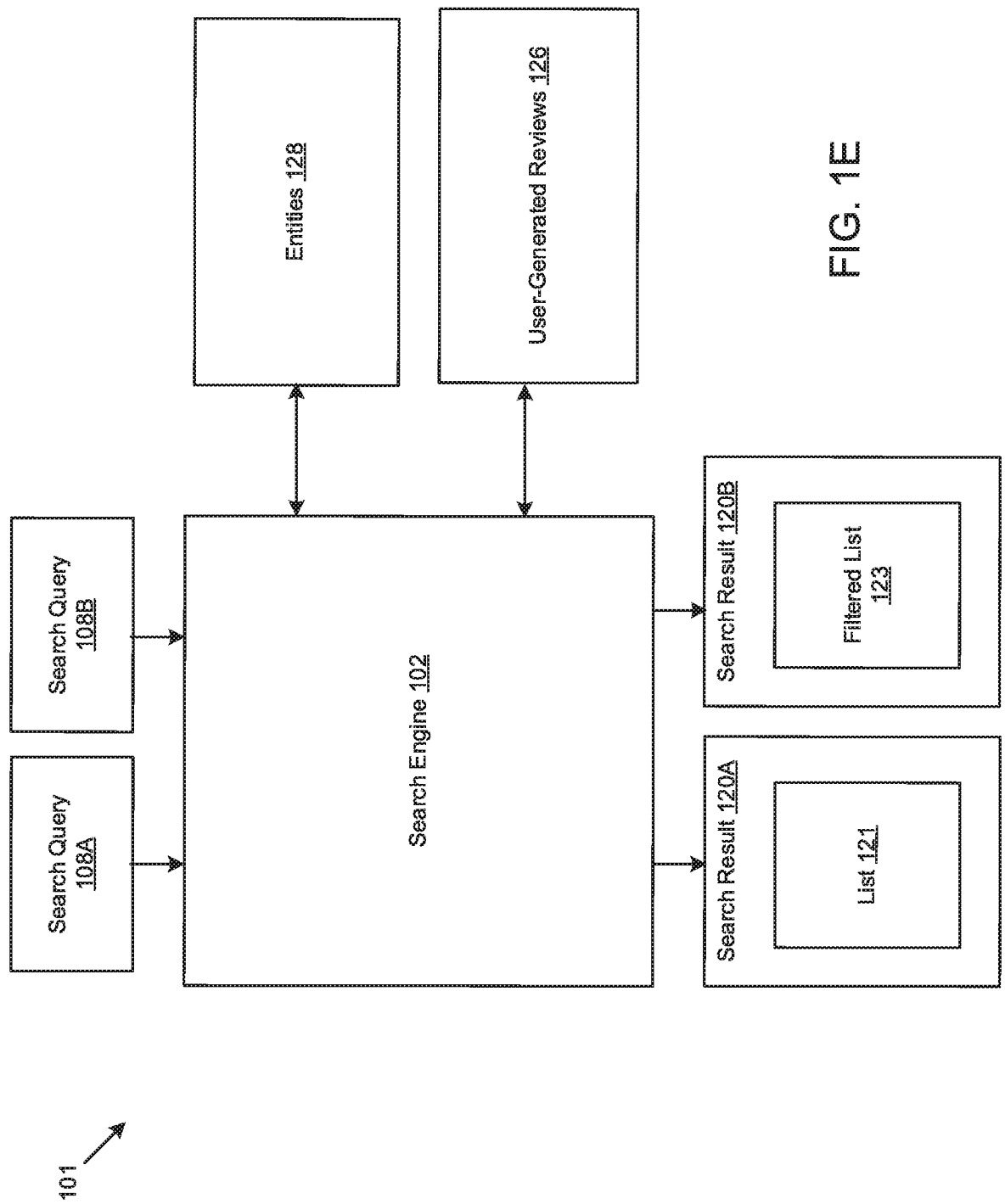
FIG. 1E illustrates a search system for using user-generated reviews as a filter on a search result according to an aspect.
Figure 1F:
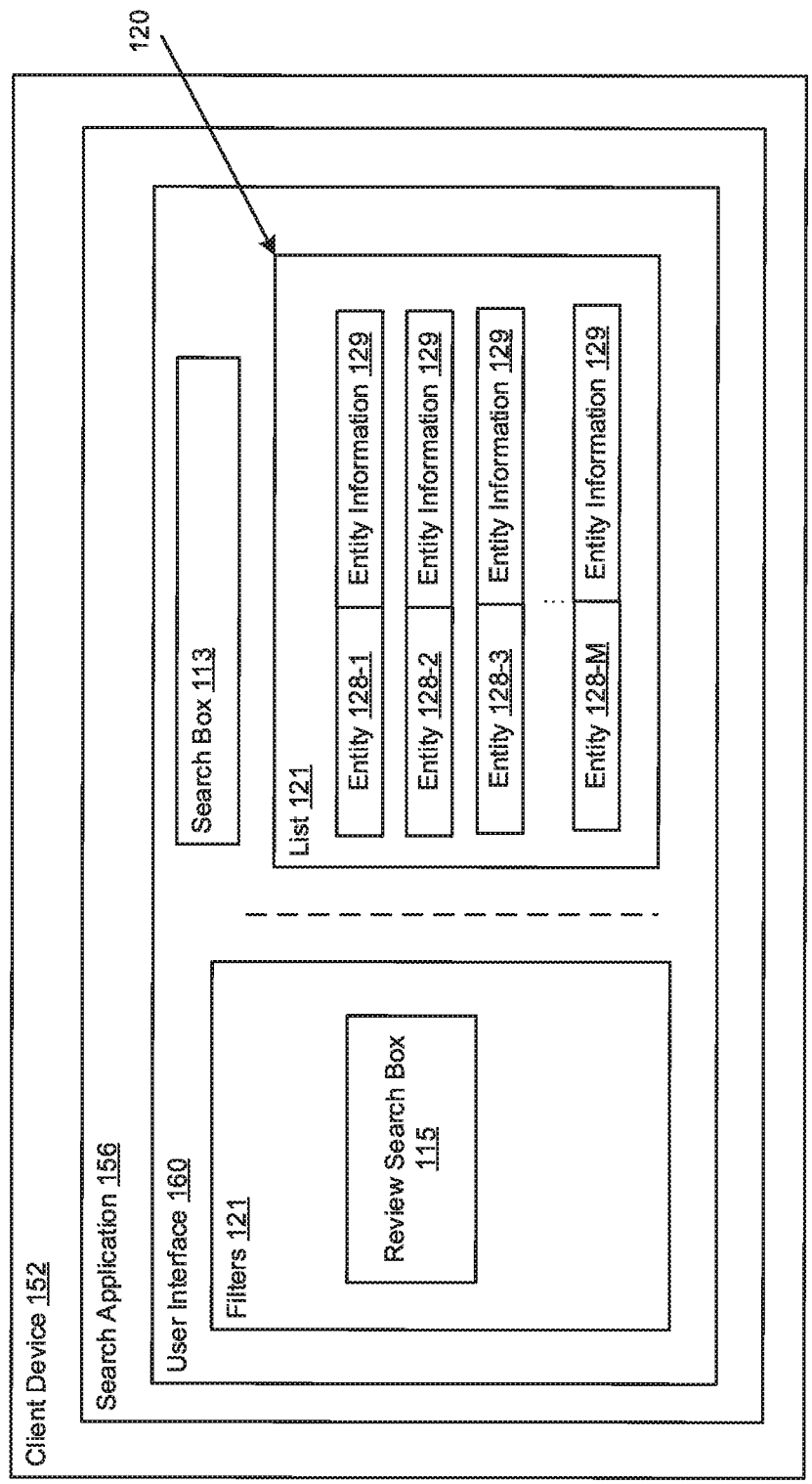
FIG. 1F illustrates an example of a user interface for viewing results of a primary search query and for submitting a search query to search user-generated reviews as a secondary search query according to an aspect.
Figure 1G:
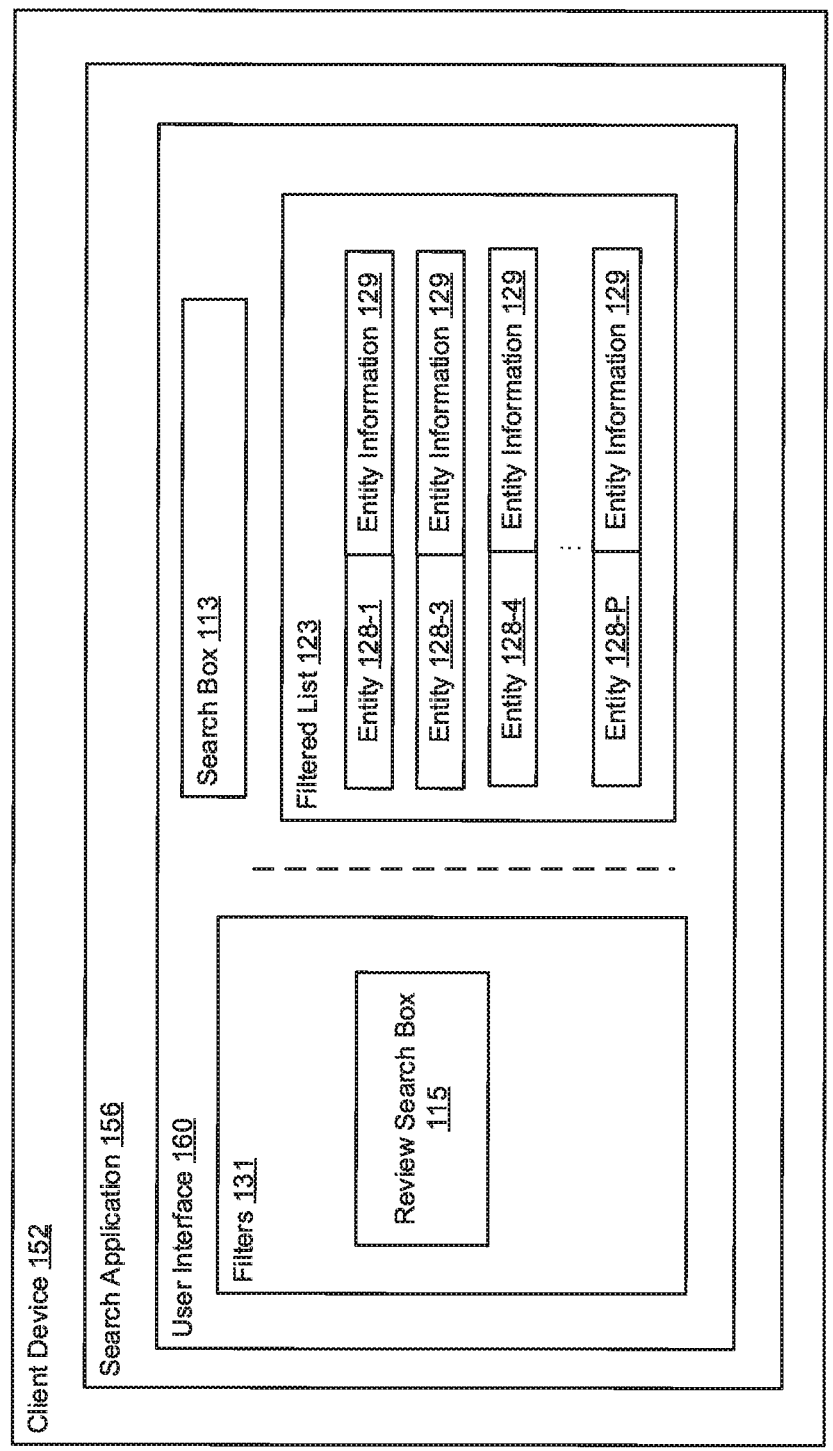
FIG. 1G illustrates an example of a user interface for viewing results of the secondary search query according to an aspect.

FIGS. 1E through 1G illustrate various examples of filtering primary search results using the user-generated reviews 126. For example, referring to FIG. 1E, the search engine 102 may receive a search query 108A (e.g., a primary search query) to search a plurality of entities 128 (e.g., a product catalog, a service product catalog, webpages, etc.) and obtain a search result 120A responsive to the search query 108A. The search query 108A may be an example of the search query 108 of FIG. 1A. Referring to FIG. 1F, a user may enter one or more search terms into a search box 113 defined on the user interface 160 of the search application 156 of the client device 152 to submit the search query 108A. The search result 120A includes a list 121 that identifies two or more entities 128 that correspond to one or more search terms of the search query 108A. For example, the list 121 may include a list of entities 128 such as a first entity 128-1, a second entity 128-2, and a third entity 128-3 through entity 128-M.

Also, referring to FIG. 1F, the user interface 160 may display entity information 129 about each respective entity 128 included within the list 121. In some examples, the entity information 129 may be similar to information included in a search result for the entity on a search result page. In some examples, the entity information 129 displays a link that, when selected, initiates an action such as taking the user to the web page for/about the entity 128. In some examples, the entity information 129 includes other information about the entity 128 such as a short description and/or location of the entity 128. With respect to the hotel example, the list 121 may identify the relevant hotels pertaining to the search query 108 as well as other information about the hotels such as the location, an image, a link to the hotel's webpage, etc. For example, a user may search for "hotels in Milwaukee" and obtain a list of hotels in the Milwaukee area.

Referring to FIG. 1E, the search engine 102 may receive a search query 108B (e.g., a secondary search query) to filter the search result 120A to obtain a filtered list 123. The filtered list 123 may identify the list of entities 128, and each entity 128 may be associated with entity information 129 as described above. The search query 108B may be an example of the search query 108 of FIG. 1A. The filtered list 123 identifies the entities 128 whose user-generated reviews 126 are responsive to the search query 108B. Referring to FIG. 1F, the user interface 160 of the search application 156 may define a review search box 115 in which the user enters one or more search terms to submit the search query 108B, which filters the search result 120B. In some examples, the user interface 160 defines a plurality of filters 131, where one of the filters 131 is the review search box 115 to search the user-generated reviews 126. The search engine 102 may search the review index 118 to identify the user-generated reviews 126 for the entities 128 included within the list 121 that correspond to the search terms(s) of the search query 108B. Referring to FIG. 1G, the search engine 102 may return a filtered list 123 that identifies the entities 128 whose user-generated reviews 126 are responsive to the search terms(s) of the search query 108B. In some examples, the filtered list 123 (and relevant portions of the user-generated reviews 126) are provided on the comparison layout 162 of FIG. 1B. The filtered list 123 may be a subset of the list 121, e.g., a first entity 128-1, a third entity 128-3 and a fourth entity 128-4 through P entity 128-P, where P is less than M. In some examples, the user can search the user-generated reviews 126 to identify a list of entities 128 by submitting a primary search query (e.g., search query 108A).

In some examples, in response to the user-generated reviews 126 being searched within the context of a primary search (e.g., search query 108A) or a secondary search query (e.g., search query 108B), the search engine 102 may rank the list of entities 128 based on each entity's user-generated reviews 126 relevance to the search term(s) 110. For example, a user may submit a search query 108 such as "bed bugs" and the search engine 102 may search the user-generated reviews 126 for the search criteria "bed bugs" and identify the user-generated reviews 126 that contain the search criteria "bed bugs." The search engine 102 may identify which entities 128 correspond to the user-generated reviews 126 that contain the search criteria "bed bugs." In some examples, the search engine 102 may rank the identified entities 128 based on the entity's user-generated reviews 126 relevance to the search term(s) 110. In some examples, the ranking may be based on the occurrence of the search term(s) 110 within a respective entity's user-generated reviews 126. For example, if the occurrence of term "bed bugs" in the user-generated reviews 126 pertaining to the first entity 128-1 is relatively high, the first entity 128-1 may be ranked higher than other entities 128. In some examples, the search engine 102 may rank the identified entities 128 based on other signals related to the user-generated reviews 126 such as helpfulness, review quality, review length, and/or the time associated when the user-generated reviews 126 were posted.

Figure 1H:
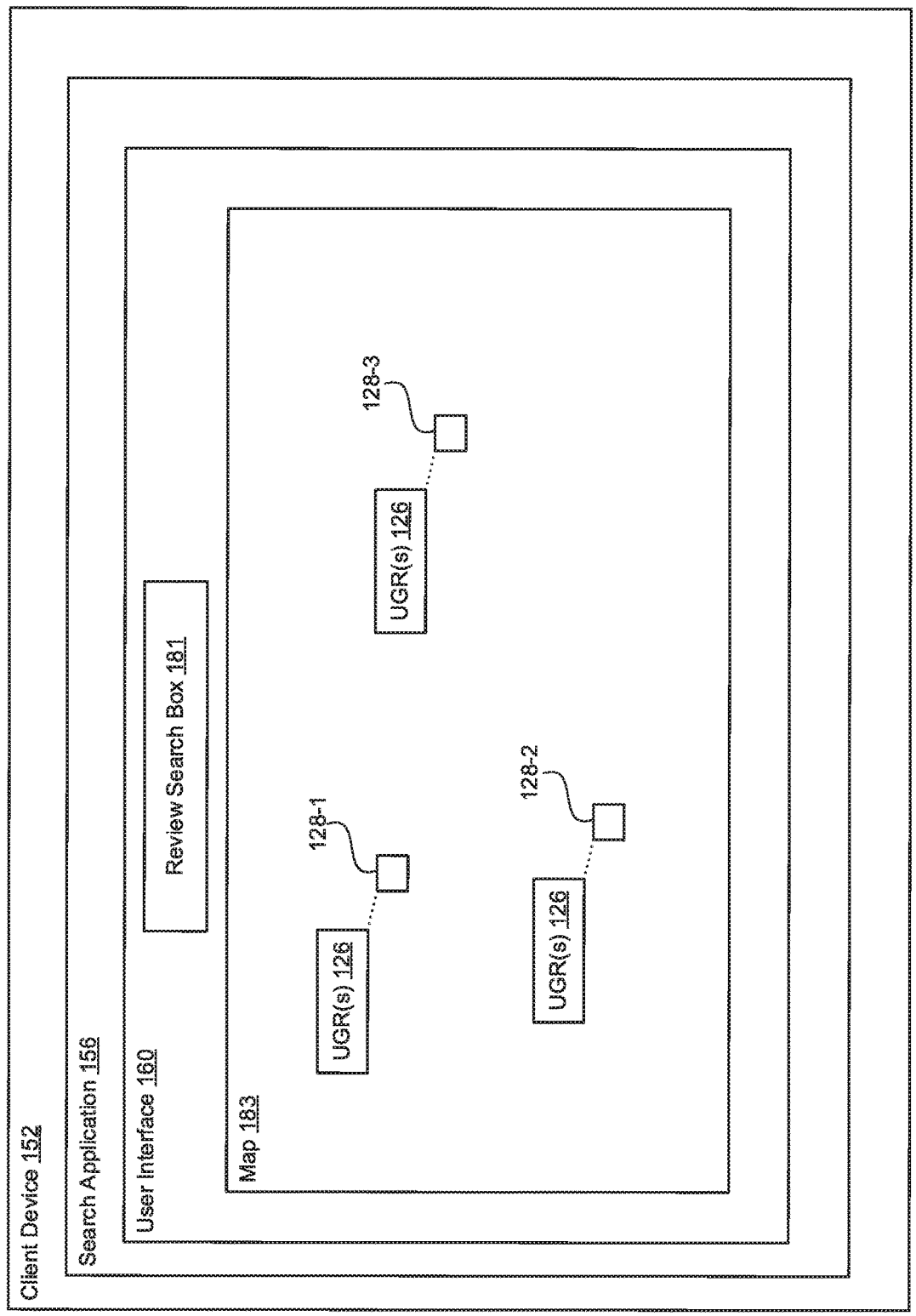
FIG. 1H illustrates an example of a user interface for displaying user-generated review search results on a map according to an aspect.

Referring to FIG. 1H, in some examples, the search application 156 is configured to display an interactive map 183 and the locations of one or more entities 128. The interactive map 183 may be provided as part of a web mapping service that is used in conjunction with the search application 156. The interactive map 183 may provide detailed information about geographical regions and sites around the world. For example, if the user is looking for accommodation options (or any type of entity 128), the interactive map 183 may be populated with entities 128 (e.g., hotels, vacation rentals, campgrounds, etc.) within a certain region (e.g., based on a previous search or interactions with the interactive map 183). As shown in FIG. 1H, the interactive map 183 displays the location of a first entity 128-1, a second entity 128-2, and a third entity 128-3.

The search system 100 may provide the ability to search within the user-generated reviews 126 and provide that search result on the interactive map 183 (in conjunction with the location of a particular entity 128). For example, the search result for the first entity 128-1 is provided in a location proximate to the location of the first entity 128-1. In some examples, a user can choose which terms to search within the user-generated reviews 126. For example, a user may enter one or more search terms within a review search box 181 on the user interface 160, and then receive the user-generated reviews 126 (or snippets) for the entities 128 on the interface map 183. The interactive map 183 may display the user-generated reviews 126 (or snippets) for the first entity 128-1, the second entity 128-2, and the third entity 128-3. In some examples, the interactive map 183 provides the search results as aggregated summaries. In some examples, if the user searches for "wifi", the interactive map 183 may display the user-generated reviews 126 (or snippets) that are responsive to the term "wifi" for the first entity 128-1, the second entity 128-1, and the third entity 128-3. In some examples, for each entity 128 displayed on the interactive map 183, an aggregated summary may be displayed. For example, with respect to the first entity 128-1, the interactive map 183 may display a UI element (next to the location of the first entity 128-1) that indicates "fast wifi (18)", where the number 18 indicates the number of reviews that contain the term "fast wifi." In some examples, the user can then click on the user interface 160 to show all the reviews relating to the term "fast wifi." With respect to the second entity 128-2, the interactive map 183 may display a UI element (next to the location of the second entity 128-2) that indicates "slow wifi (6)", where the number 6 indicates the number of reviews that contain the term "slow wifi." In some examples, the user can then click on the user interface 160 to show all the reviews relating to the term "slow wifi."

In some examples, review sentiments (whether as aggregated summaries or individual quotes) may be provided on the interactive map 183. The review sentiments may be keywords (e.g., keywords 313 of FIG. 3), which can be terms that are most often mentioned in user reviews. For example, with respect to hotels, the review sentiments may be beach, atmosphere, food, fitness, etc. In some examples, in response to the entities 128 being populated on the interactive map 183, the user-generated reviews 126 may be searched according to one or more review sentiments (e.g., keywords), and those search results may be provided on the interactive map 183. For example, with respect to the first entity 128-1, the interactive map 183 may provide a UI element that indicates "close to grocery store (12)" and/or "comfortable beds (3)."

In some examples, the search system 100 may provide individual snippets and/or provide various types of aggregate data. In some examples, the search system 100 may identify one or more categories or sub-categories pertaining to a search query. For example, if a user queries "wifi", the search system 100 may provide aggregates of categories pertaining to wifi (e.g. speed, reliability, cost), where the categories can be predefined or generated based on a text analysis. In some examples, the search system 100 may provide sentiment aggregates for one or more of those categories (or each of those categories), as well as an overall aggregation of whether the wifi was good or bad, based on all those factors. For example, in response to a search for "wifi", the search system 100 may provide aggregate data with respect to how many users say the wifi is fast, how many users say the wifi is slow, how many users say the wifi is reliable versus spotty, how many users say the wifi expensive versus free, how many users just say "nice/good/great" wifi versus "bad/poor" wifi, etc. In some examples, the search system 100 can determine and provide how many (or what percent of) users say overall good wifi versus overall bad wifi. As such, the search system 100 may provide the ability to aggregate queries by sub-category (e.g. speed, reliability, cost) and provide a holistic aggregate across all sub-categories.

In some examples, the review search result 120 includes audio summaries. For example, the search system 100 may perform text-to-speech on the relevant portions of the user-generated reviews 126 and/or obtain the relevant moments from videos to construct audio compilations of what people say about a particular entity 128 or what they say about a particular thing about the entity 128. In some examples, the search system 100 provides the ability to search within video reviews left by users, and, in some examples, the search system 100 can compile video clips on those keywords or topics for people (e.g., "show me video clips of room exteriors in a compilation", "show me clips of people talking about the wifi in a compilation", etc.).

In some examples, the online platform 101 and/or the search engine 102 is configured to operate in conjunction with an augmented reality (AR) application and/or a virtual reality (VR) application. In some examples, the AR/VR application may provide any of the review searching and display techniques discussed herein. In some examples, the user of client device 152 may execute an AR application that analyzes image data captured by the client device 152. An entity 128 within the image data may be identified, and the search engine 102 may obtain and display user-generated reviews 126 (or information about the user-generated reviews 126) that pertain to the identified entity 128. In some examples, the search query 108 is identified based on image data (e.g., review results may be obtained based on image recognition). For example, a user may be capturing image data within a store, and for one or more products identified within the image data, the user-generated reviews 126 may be obtained and displayed by the client device 152. In some examples, the client device 152 is a wearable product that can display and interact with the search results as the client device 152 encounters entities 128. These techniques could be used in real time to compare products in a store or entities on the street (for example), but also a user could identify entities 128 (e.g., "pin" entities) to create a comparison grip to search within.

In some examples, reviews can be searched and obtained based on map (e.g., geo-based) coordinates of a user (which may be an AR user). In some examples, the search system 100 can provide suggestions (e.g., intelligent or smart suggestions) based on the searchable user-generated reviews 126 (e.g., without the user submitting a search).

In some examples, using the online platform 101, users can submit indications of tips (or suggestions) (also referred to as "UGC tips") with respect to locations (e.g., using the interactive map 183). For example, a user can drop a pin (e.g., mark a location on the interactive map 183) and leave a UGC tip (e.g., "this path right here is a shortcut and really pretty walk", "careful of pickpockets in this area", etc.). In some examples, the user can walk down the street, and the search system 100 may provide the UGC tips as the user walks around. Furthermore, in some examples, users may submit audio clips of themselves talking about something at a particular place, and a user may have the ability, based on geo-coordinates, to search within those audio files. In some examples, the user can be physically walking around and can hear audio summaries or read aggregated summaries. In some examples, the user is on a computer, and can hover over a map entity and can search within the reviews to learn about what people are saying about a particular tree or bench in central park.

Figure 2:
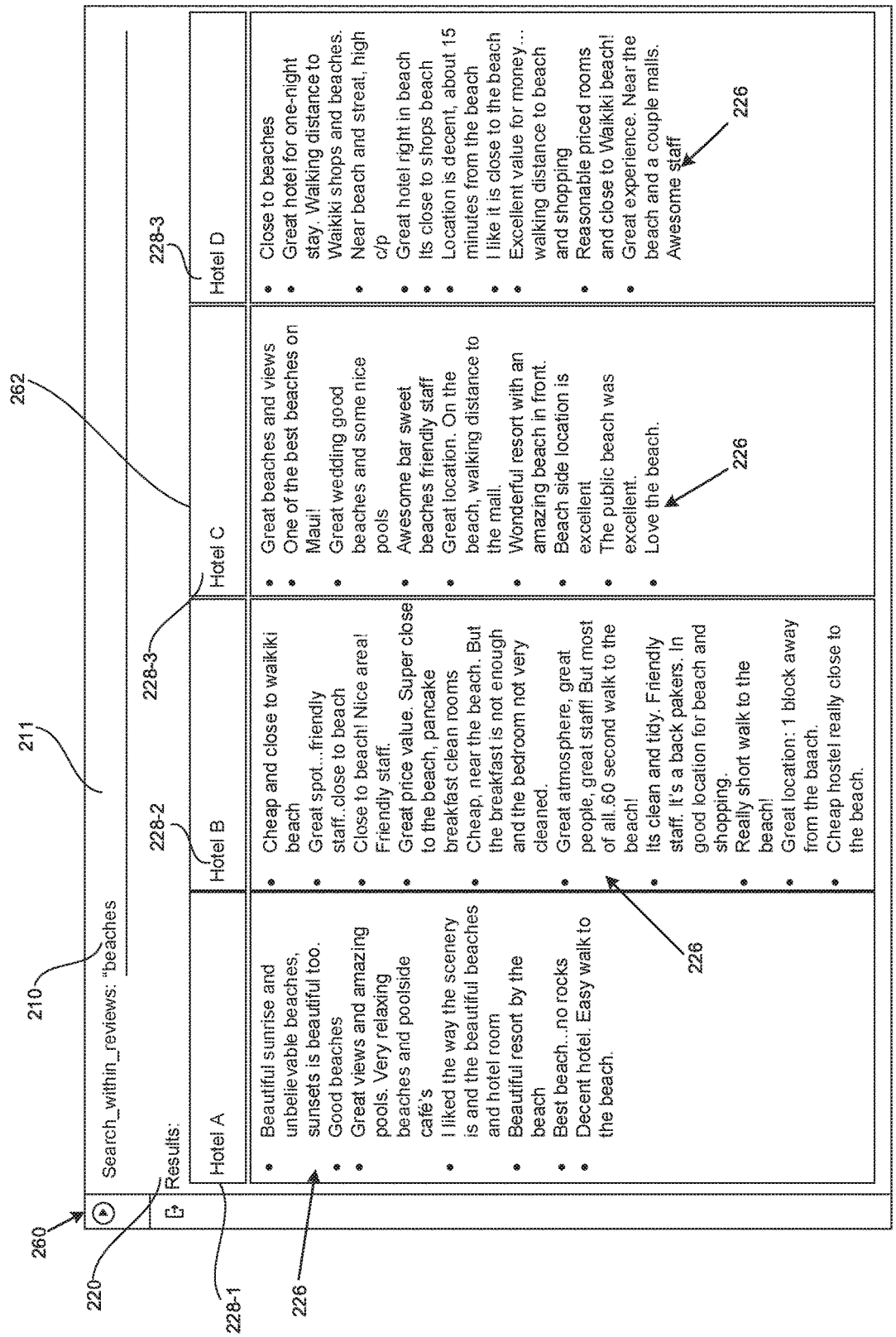
FIG. 2 illustrates a comparison layout according to an aspect.

FIG. 2 illustrates an example of a comparison layout 262 of a user interface 260 according to an aspect. The search engine 102 of FIG. 1A may provide a search result 220 in the comparison layout 262 in response to a search query (e.g., search query 108A or search query 108B. As shown in FIG. 2, the user interface 260 may define a search box 211 in which the user can enter one or more search terms 210 (e.g., "beaches"). In response to the submission of the search term(s) 210, the comparison layout 262 is populated with portions of user-generated reviews 226 so that the user can compare the entities 128 in a single place/page (e.g., without having to switch between tabs). The comparison layout 262 includes snippets of the user-generated reviews 226, where a particular snippet (from one user-generated review 226) is indicated by a dot. The comparison layout 262 includes relevant snippets of user-generated reviews 226 for a first entity 228-1 (e.g., Hotel A), relevant snippets of user-generated reviews 226 for a second entity 228-2 (e.g., Hotel B), relevant snippets of user-generated reviews 226 for a third entity 228-3 (e.g., Hotel C), and relevant snippets of user-generated reviews 226 for a fourth entity 228-4 (e.g., Hotel D). In some examples, the comparison layout 262 includes a column grid layout of entities (e.g., side by side), which lets users compare the entities in a single place/page (rather than having to switch between tabs). Users can query for another term using the search box 211, thereby repopulating the list of hotels based on the user-generated reviews 126 that are responsive to the new query. In some examples, users can click on words within the user-generated reviews 226 to repopulate the comparison layout 262 with relevant snippets related to whatever word is selected.

Figure 3:
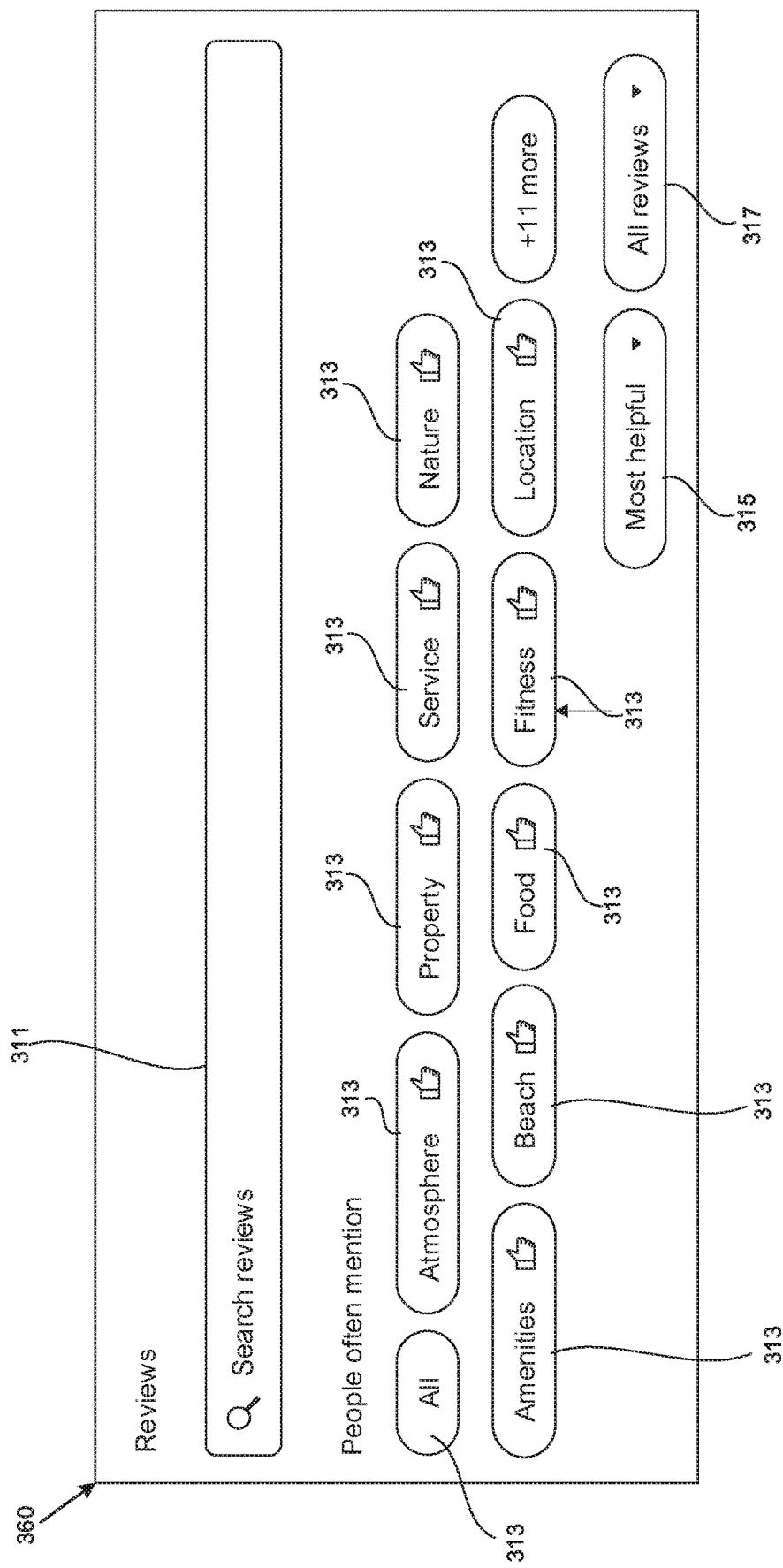
FIG. 3 illustrates an example of a user interface for submitting a search query according to an aspect.

FIG. 3 illustrates an example of a user interface 360 depicting a search box 311 and a plurality of selectable keywords 313. The user interface 360 may be an example of a search box used in the user interface 160 of FIGS. 1A through 1H and/or the user interface 260 of FIG. 2 and may include any of the details discussed with reference to those figures. In some examples, a user may enter one or more search terms into the search box 311 to search the user-generated reviews. Also, in the example of FIG. 3, instead of typing search terms, a user may select one of the selectable keywords 313, which then returns user-generated reviews that include the selected keyword 313. For example, the search engine 102 of FIG. 1A may determine keywords 313 from the user-generated reviews, and then provide those keywords 313 on the user interface 360, where the keywords 313 function as pivot/search-chips, so the user does not have to actually type the query. In the example of FIG. 3, the keywords 313 are those mentioned most often in user reviews. Also, the user interface 360 may define a "most helpful" selectable option 315 that, when selected, causes the user interface 360 to display a select number of user-generated reviews that are determined as "most helpful" based on one or more signals such as helpfulness, review quality, review length, and/or the time associated when the user-generated reviews were posted. Also, the user interface 360 may define a "all reviews" selectable option 317 that, when selected, causes the user interface 360 to display all the reviews.

Figure 4:
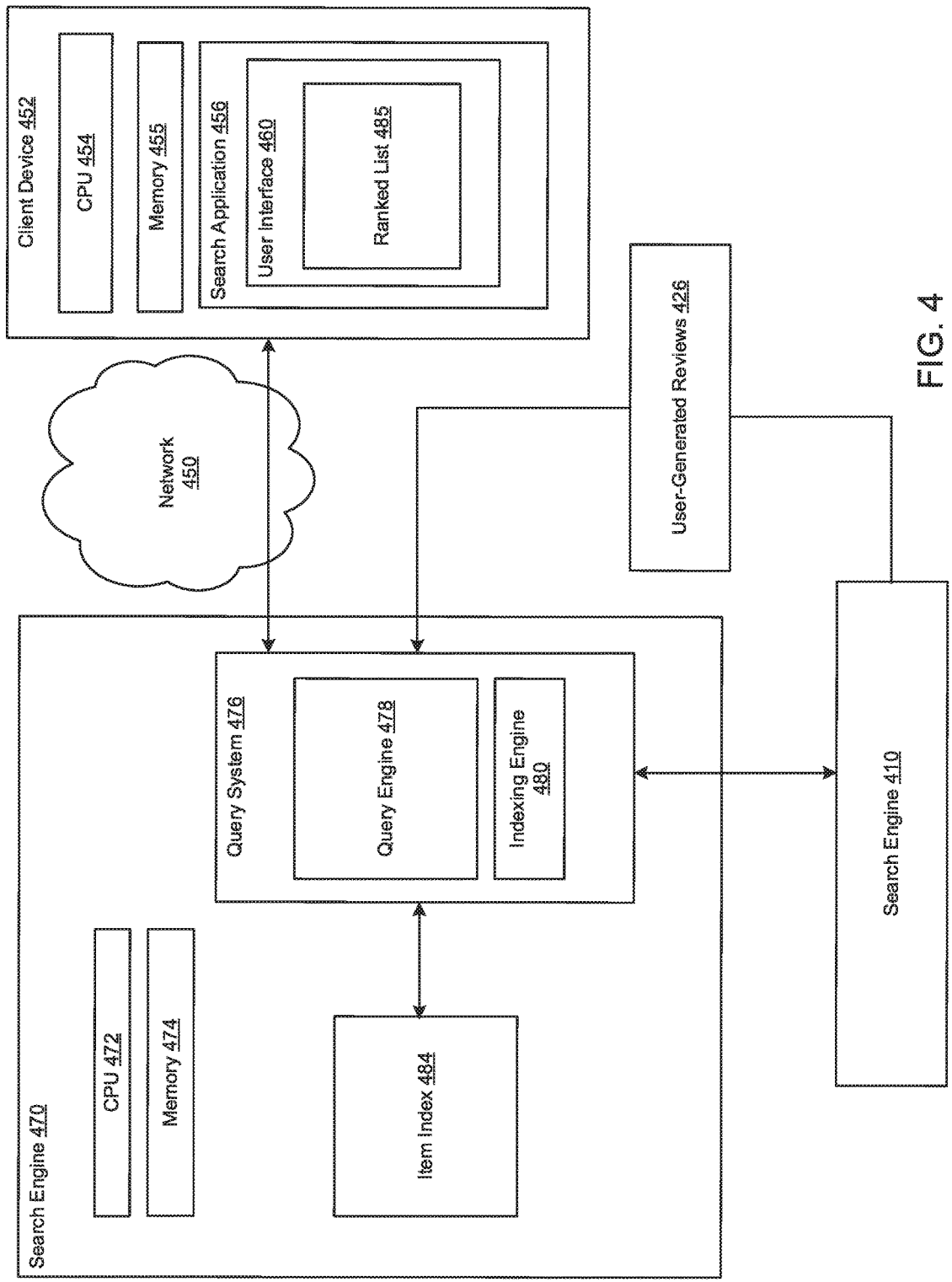
FIG. 4 illustrates an example of a search system that searches web pages and generates a search result to be displayed as a ranked list of web items in which one or more of the ranking signals includes signals derived from user-generated reviews according to an aspect.

FIG. 4 illustrates an example of a search system 400 that searches a primary corpus (e.g., web pages, product, catalog, service provider catalog, etc.) and generates a search result to be displayed as a ranked list 485 of responsive entities on a user interface 460 of a search application 456 of a client device 452 in which one or more of the ranking signals are derived from user-generated reviews 426 according to an aspect. The search system 400 may be an example of the search system 100 of FIGS. 1A through 1H and may include any of the details discussed with respect to those figures as well as the details from FIGS. 2 through 3.

The search system 400 includes a search engine 470 and a search engine 410. In some examples, the search engine 470 is a separate module from the search engine 410, where the search engine 470 is communicatively coupled to the search engine 410 in order to exchange information between the two modules. In some examples, the search engine 410 and the search engine 470 are included in the same module (e.g., the search engine 410 (or the functionalities of the search engine 410) are part of the search engine 470). For example, the search engine 470 may search the entities as well as the user-generated reviews 426 according to any of the techniques described with respect to the previous figures. In some examples, the search engine 410 may be an example of the search engine 102 of FIGS. 1A through 1H and may include any of the details discussed with respect to those figures.

If the search system 400 receives a query that relates to "Hotels in Milwaukee," the search engine 470 may obtain a list of entities from the primary corpus related to "Hotels in Milwaukee." The search engine 470 may then rank the list of entities (e.g., web pages) according to a plurality of ranking signals, where at least some of the ranking signals are derived from the user-generated reviews 426. For example, if the list of entities identifies a first web page corresponding to a first hotel, a second web page corresponding to a second hotel, and a third web page corresponding to a third hotel, the list of entities may be ranked according to the user-generated reviews 426 about the first hotel, the second hotel, and the third hotel. For instance, if the rating score (e.g., an overall or average rating score) and/or an analysis about the content of the user-generated reviews 426 indicates that users have a relatively low impression of the first hotel, the first hotel may be down-ranked. Conversely, if the rating score and/or an analysis about the content of the user-generated reviews 426 indicates that the users have a relatively high impression of the first hotel, the first hotel may be up-ranked. In another example, a search system 400 that searches a product database may receive a query of "headphones for running" and may identify several items responsive to "headphones" but not "running." In such an example the search system 400 may rank a responsive item where "running" or "run" is mentioned in user reviews for the item ahead of other responsive items that lack user reviews mentioning "running" or "run".

The search engine 470 includes a query system 476. The query system 476 enables the search engine 470 to receive and respond to queries. Also, the query system 476 may be responsible for searching one or more indices, represented collectively as item index 486. The item index 486 may include a web document index, e.g., an inverted index that associates terms, phrases, and/or n-grams with web documents. Web documents can be any content accessible over the Internet, such as web pages, images, videos, PDF documents, word processing documents, audio recordings, etc.

The query system 476 includes a query engine 478 and an indexing engine 480. For example, the indexing engine 480 may add items to an item index 486, update items in the item index 486, and delete items from the item index 486. In some examples, the indexing engine 480 may work with one or more crawlers. A crawler searches for items accessible via the Internet and returns content (including metadata) for the items. The indexing engine 480 may use the content and/or metadata to generate and update the item index 486. In some examples, the item index 484 used for searching entities (e.g., web content) is different from the review index 118 of FIG. 1A.

Generally, the query engine 478 may obtain responsive items from the item index 486, rank the responsive items, generate a search result for at least some of the responsive items, and provide the search results to the query requestor, e.g. the client device 452. For example, the query engine 478 may receive queries from requestors, such as the client device 452, analyze the query to determine how to search item index 486, and to initiate the search of the item index 486. A user may submit a query, e.g., a word, a phrase, a list of words, an image, a recording etc., to search engine 470. The search engine 470, specifically the query engine 478, uses one or more indices (e.g., the item index 486) to identify items that are returned in response to the query. Items returned to the query engine 478 in response to the query may also be referred to as responsive items. The query engine 478 may generate a search result for some or all of the responsive items.

The query engine 478 may rank the responsive items. Ranking can include applying one or more ranking signals to a responsive item. Ranking signals can include many factors. Non-limiting examples are a PageRank for the item, a relevance score for the item, a source of the item, and many others. In addition, the ranking signals may include one or more ranking signals derived from the user-generated reviews 426 associated with the entities of the responsive items found by the query engine 478. For example, the query engine 478 may identify the entities associated with the responsive items. For example, if the list of entities identifies a first hotel, a second hotel, and a third hotel, the query engine 478 may identify the first hotel, the second hotel, and the third hotel as the entities associated with the responsive items.

Then, the query engine 478 or the search engine 410 may obtain the user-generated reviews 426 associated with the identified entities. For example, the query engine 478 or the search engine 410 may search the review index 118 of FIG. 1A using the identified entities as search criteria to obtain the user-generated reviews 426 that correspond to the identified entities. The query system 476 or the search engine 410 may derive one or more ranking signals based on the user-generated reviews 426. For example, the query system 476 or the search engine 410 may obtain rating scores associated with the relevant user-generated reviews and/or analyze the content of the user-generated reviews to provide a signal indicating a level of user impression of the underlying entity. In addition, the ranking signals related to the user-generated reviews 426 may include signals related to helpfulness, review quality, review length, and/or the time associated when the user-generated reviews were posted. Based on the ranking signal(s) associated with the user-generated reviews (in conjunction with other types of ranking signals), the query engine 478 may rank the list of web items to generate the ranked list 485.

The search engine 470 may include one or more processors 472 formed in a substrate, an operating system (not shown) and one or more computer memories 474. The computer memories 474 may represent any kind of memory (e.g., RAM, flash, cache, disk, tape, etc.). The memory 474 may represent multiple kinds of memory. In some examples (not shown), the memory 474 may include external storage, e.g., memory physically remote from but accessible by search engine 470.

The query system 476 may be in communication with client device(s) 452 over a network 450. Network 450 may be for example, the Internet, a cellular network, a wired or wireless local area network (LAN), wide area network (WAN), etc. The network 450 may represent multiple types of networks. Via the network 450, the query system 476 may communicate with and transmit data to/from client devices 452. The client device 452 may be an example of the client device 152 of FIGS. 1A through 1H and may include any of the details discussed with respect to those figures. The client device 452 may include one or more processors 454 formed in a substrate configured to execute one or more machine executable instructions or pieces of software, firmware, or a combination thereof. The processors 454 can be semiconductor-based—that is, the processors can include semiconductor material that can perform digital logic. The client device 452 can also include one or more computer memories 455. The memories 455, for example, a main memory, may be configured to store one or more pieces of data, either temporarily, permanently, semi-permanently, or a combination thereof. The memories 455 may include any type of storage device that stores information in a format that can be read and/or executed by the one or more processors 454. The memories 455 may store applications, modules and/or engines that, when executed by the one or more processors 454, perform certain operations. In some examples, the applications, modules, or engines, may be stored in an external storage device and loaded into the memory 455.

The applications may include any number of applications configured to execute on the client device 452, such as an operating system, a messaging application, shopping applications, editing applications, search assistants, maps, etc. In particular, the applications include a search application 456. The search application 456 is operable to receive web page code (e.g., HTML, JavaScript, etc.) and render the web page for presentation to a user of the client device 452.

Figure 5:
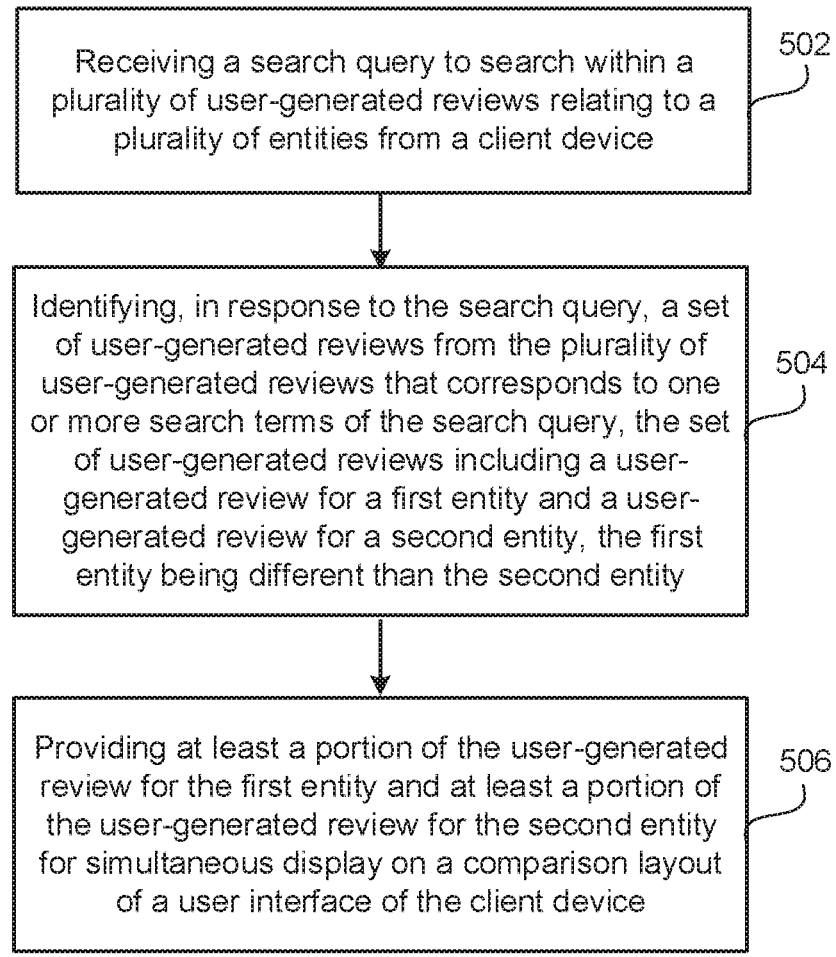
FIG. 5 illustrates a flowchart depicting example operations for searching within user-generated reviews according to an aspect.

FIG. 5 illustrates a flowchart 500 depicting example operation of a search system according to an aspect. Although the flowchart 500 of FIG. 5 illustrates the operations in sequential order, it will be appreciated that this is merely an example, and that additional or alternative operations may be included. Further, operations of FIG. 5 and related operations may be executed in a different order than that shown, or in a parallel or overlapping fashion. In some examples, the operations of the flowchart 500 may be combined with one or more of the operations of the flowchart 600 of FIG. 6A, the flowchart 650 of FIG. 6B, and/or the flowchart 700 of FIG. 7. Although the flowchart 500 is described with reference to the search system of FIGS. 1A through 1H, the flowchart 500 may be applicable to any of the embodiments discussed herein. The flowchart 500 relates to a method for searching within user-generated reviews for multiple entities.

The flowchart 500 describes operations that enable searching within user-generated reviews 126 across multiple entities 128 of a particular type. The multiple entities 128 may be selected by the user or identified as a result of a previous search. The review search result 120 can be provided in a comparison layout 162 that identifies user-generated reviews 126 for multiple entities 128 that corresponds to the search term(s) 110. In other words, a user can search within and compare user-generated reviews 126 for several entities at once. A user may submit a search query 108 (e.g., "kitchen"), and the search engine 102 obtains user-generated reviews 126 for multiple entities 128 (e.g., hotel A, hotel B, hotel C, etc.) that meet the search term(s) 110. Then, the search engine 102 provides these user-generated reviews 126 (or portions thereof) in the comparison layout 162 so that the user can compare the entities 128 in a single place/page (e.g., without having to switch between tabs).

Operation 502 includes receiving a search query 108 to search within a plurality of user-generated reviews 126 relating to a plurality of entities 128 from a client device 152. The user may enter text into a search box (e.g., search box 211 of FIG. 2 or search box 311 of FIG. 3) on the user interface 160 of a search application 156 to submit a search query 108. In some examples, selection of a selectable keyword (e.g., selectable keywords 313 of FIG. 3) provided on the user interface 160 causes the submission of a search query 108. In response to the submission of the search query 108, the query system 112 (e.g., the query engine 114) may receive the search query 108 over the network 150 from the client device 152. The user-generated reviews 126 are indexed (e.g., an inverted index) and searchable. In some examples, the user-generated reviews 126 are not necessarily stored within a traditional database, but rather can be stored as a synthetic corpus of web documents that are indexed and searchable (e.g., similar to the way web pages are indexed and searchable by a web browser).

Operation 504 includes identifying, in response to the search query 108, a set of user-generated reviews 126 from the plurality of user-generated reviews 126 that corresponds to one or more search terms 110 of the search query 108, where the set of user-generated reviews 126 includes a user-generated review 126 for a first entity 128-1 and a user-generated review 126 for a second entity 128-2. The first entity 128-1 is different from the second entity 128-2 but relates to the same type of entity as the second entity 128-2. For example, the query engine 114 may search the user-generated reviews 126 to identify the user-generated reviews 126 that meet the search term(s) 110 of the search query 108. In some examples, the query engine 114 searches a review index 118 associated with the user-generated reviews 126 to identify the set of user-generated reviews. For example, in response to a user posting a user-generated review 126 to the online platform 101, the user-generated review 126 is parsed and a review index 118 is updated by an indexing engine 116 to add a review to the review index 118. In response to the search query 108, the review index 118 can be quickly searched to identify the user-generated reviews 126 that contain one or more search term(s) 110 of the search query 108. In this manner, although the corpus of user-generated reviews 126 may quickly change over time, the search system 100 may still retrieve the relevant user-generated reviews 126 across multiple entities 128 in a relatively quick manner.

Operation 506 includes providing at least a portion of the user-generated review 126 for the first entity 128-1 and at least a portion of the user-generated review 126 for the second entity 128-2 for simultaneous display on a comparison layout 162 of a user interface 160 of the client device 152. For example, the search engine 102 provides these user-generated reviews 126 (or portions thereof) in a comparison layout 162 on the user interface 160 of the client device 152 so that the user can compare the entities 128 in a single place/page (e.g., without having to switch between tabs). The comparison layout 162 may be a user interface design that is populated with user-generated reviews 126 (or portions thereof) for multiple entities 128 in a manner that allows the user to compare the relevant user-generated reviews 126 for multiple entities 128. As shown in FIG. 1B, the comparison layout 162 includes user-generated reviews 126 (or snippets) for a first entity 128-1 and user-generated reviews 126 (or snippets) for a second entity 128-2, where the user-generated reviews 126 relate to one or more search terms 110 of the search query 108. In some examples, the comparison layout 162 includes a column grid layout of entities 128 (e.g., side by side), which allows users to compare the entities 128 in a single place/page. Users can query for another term, thereby repopulating the list of entities based on the user-generated reviews 126 that are responsive to the new query.

In some examples, the search engine 102 may obtain relevant snippets from the user-generated reviews 126 so users can see many reviews at once, and they do not have to sift through a long review to find the relevant sentence. In some examples, the relevant portion is surfaced, and users may click to see the full review. Users can access the full review by either expanding in-line or going to a different page. For example, in response to a user-provided action taken with respect to a snippet of a user-generated review 126 (e.g., the user clicks on the snippet), the entire contents of the user-generated review 126 is displayed. In some examples, snippets are not created, but rather the entire contents of the user-generated review 126 are displayed in the comparison layout 162.

Figure 6A:
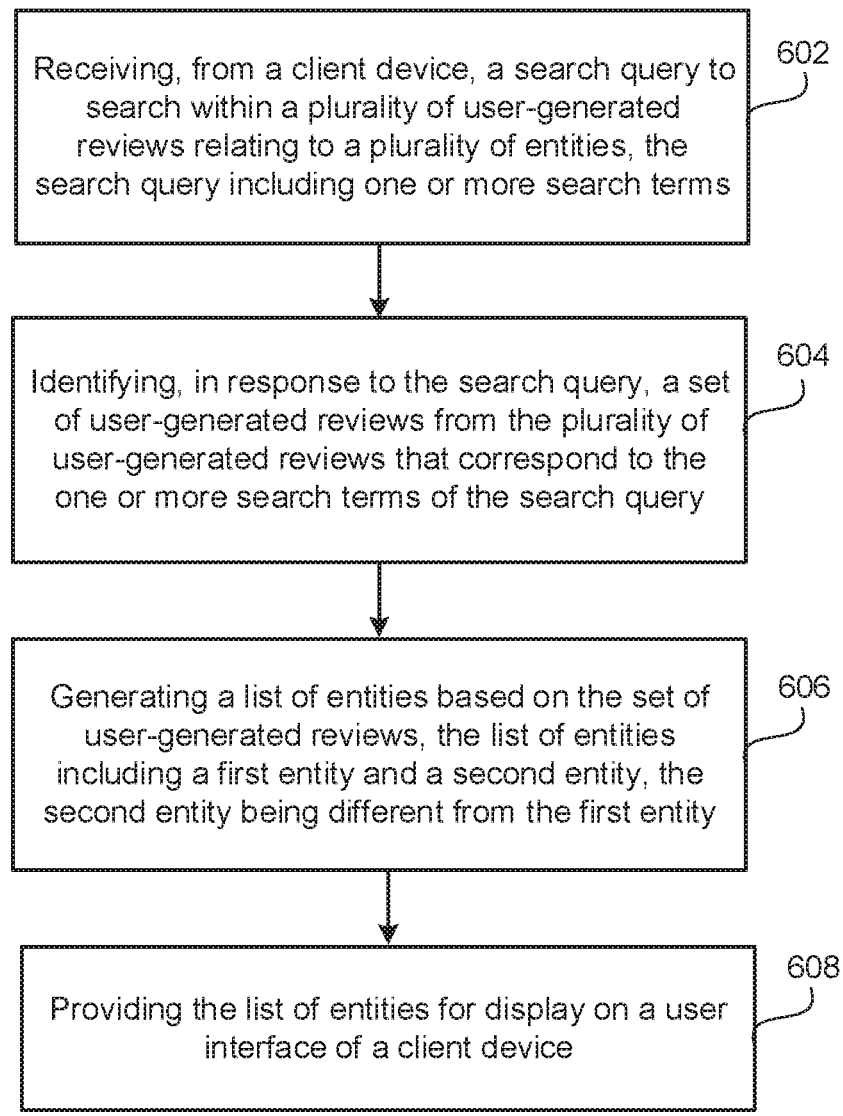
FIG. 6A illustrates a flowchart depicting example operations for searching within user-generated reviews according to another aspect.

FIG. 6A illustrates a flowchart 600 depicting example operation of a search system according to an aspect. Although the flowchart 600 of FIG. 6A illustrates the operations in sequential order, it will be appreciated that this is merely an example, and that additional or alternative operations may be included. Further, operations of FIG. 6A and related operations may be executed in a different order than that shown, or in a parallel or overlapping fashion. In some examples, the operations of the flowchart 600 may be combined with one or more of the operations of the flowchart 500 of FIG. 5, the flowchart 650 of FIG. 6B, and/or the flowchart 700 of FIG. 7. Although the flowchart 600 is described with reference to the search system of FIGS. 1A through 1H, the flowchart 600 may be applicable to any of the embodiments discussed herein. The flowchart 600 relates to generating (and ranking) a list of entities 128 based on each entity's user-generated reviews 126 relevance to the search term(s) 110.

For example, a list of entities 128 may be generated (and perhaps ranked) based on searching within the user-generated reviews 126 and/or on the search term(s) 110 relevance to each entity's user-generated reviews 126. In some examples, the list of entities 128 is the filtered list 123 as a result of a secondary search query. In some examples, the list of entities 128 is a list that was generated as a result of a primary search query. The list of entities 128 identifies two or more entities as a result of the search query 108 within the user-generated reviews 126. For example, a user may submit a search query 108 (e.g., search query 108A or search query 108B) such as "free breakfast" and the search engine 102 may search the user-generated reviews 126 for the search criteria "free breakfast" and identify the user-generated reviews 126 that contain the search criteria "free breakfast." The search engine 102 may identify which entities 128 correspond to the user-generated reviews 126 that contain the search criteria "breakfast" using the review index 118. For example, the review index 118 may associate a web document (corresponding to a particular user-generated review 126) with an entity 128-1.

In some examples, the search engine 102 may rank the identified entities 128 based on the entity's user-generated reviews 126 relevance to the search term(s) 110. In some examples, the ranking may be based on the occurrence of the search term(s) 110 within a respective entity's user-generated reviews 126. For example, if the occurrence of terms "free breakfast" in the user-generated reviews 126 pertaining to the first entity 128-1 is relatively high, the first entity 128-1 may be ranked higher than other entities 128.

Operation 602 includes receiving a search query 108 to search within a plurality of user-generated reviews 126 relating to a plurality of entities 128 from a client device 152. The search query 108 includes one or more search terms 110. The user may enter text into a search box (e.g., review search box 115 of FIGS. 1F and 1G, search box 211 of FIG. 2, or search box 311 of FIG. 3) on the user interface 160 of the search application 156 to submit a search query 108 (e.g., search query 108A or search query 108B). In some examples, selection of a selectable word or keyword (e.g., selectable keywords 313 of FIG. 3) provided on a user interface 160 causes the submission of a search query 108. In response to the submission of the search query 108, the query system 112 (e.g., the query engine 114) may receive the search query 108 over the network 150 from the client device 152. The user-generated reviews 126 are indexed and searchable.

Operation 604 includes identifying, in response to the search query 108, a set of user-generated reviews 126 from the plurality of user-generated reviews 126 that corresponds to one or more search terms 110 of the search query 108. For example, the query engine 114 may search the user-generated reviews 126 to identify the user-generated reviews 126 that meet the search term(s) 110 of the search query 108. In some examples, the query engine 114 searches a review index 118 associated with the user-generated reviews 126 to identify the set of user-generated reviews 126. For example, in response to a user posting a user-generated review 126 to the online platform 101, the user-generated review 126 is stored as a web document, and a review index 118 is updated by an indexing engine 116 to add an item to the review index 118. In response to the search query 108, the review index 118 can be quickly searched to identify the user-generated reviews 126 that contain one or more search term(s) 110 of the search query 108. In this manner, although the corpus of user-generated reviews 126 may quickly change over time, the search system 100 may still retrieve the relevant user-generated reviews 126 across multiple entities 128 in a relatively quick manner.

Operation 606 includes generating a list of entities 128 based on the set of user-generated reviews 126, where the list of entities 128 includes a first entity 128-1 and a second entity 128-2. The second entity 128-2 is different from the first entity 128-1. For example, the search engine 102 may generate (or discover) entities 128 based on the search term(s) 110 of the search query 108. For example, a user may submit a search query 108 such as "beaches" and the search engine 102 may search the user-generated reviews 126 for the search criteria "beaches" and identify the user-generated reviews 126 that contain the search criteria "beaches." Then, the search engine 102 may identify which entities 128 correspond to the user-generated reviews 126 that contain the search criteria "beaches" using the review index 118. In some examples, the search engine 102 may rank the identified entities 128 based on the entity's user-generated reviews 126 relevance to the search term(s) 110. In some examples, the ranking may be based on the occurrence of the search term(s) 110 within a respective entity's user-generated reviews 126. For example, if the occurrence of term "beaches" in the user-generated reviews 126 pertaining to the first entity 128-1 is relatively high, the first entity 128-1 may be ranked higher than other entities 128.

Operation 608 includes providing the list of entities 128 for display on a user interface 160 of a client device 152. In some examples, the search engine 102 may provide the list of entities 128 for display on the user interface 160 of the search application 156 of the client device 152. In some examples, the list of entities 128 is populated within the comparison layout 162. In some examples, each entity 128 on the list may include entity information 129 that displays information about the respective entity 128 on the user interface 160. In some examples, the entity information 129 displays a link that when selected initiates an action such as taking the user to the web page of the entity 128. In some examples, the entity information 129 includes other information about the entity 128 such as a short description and/or location of the entity 128. With respect to the hotel example, the list of entities 128 may identify the relevant hotels pertaining to the search query 108 as well as other information about the hotels such as the location, a link to the hotel's webpage, etc.

Figure 6B:
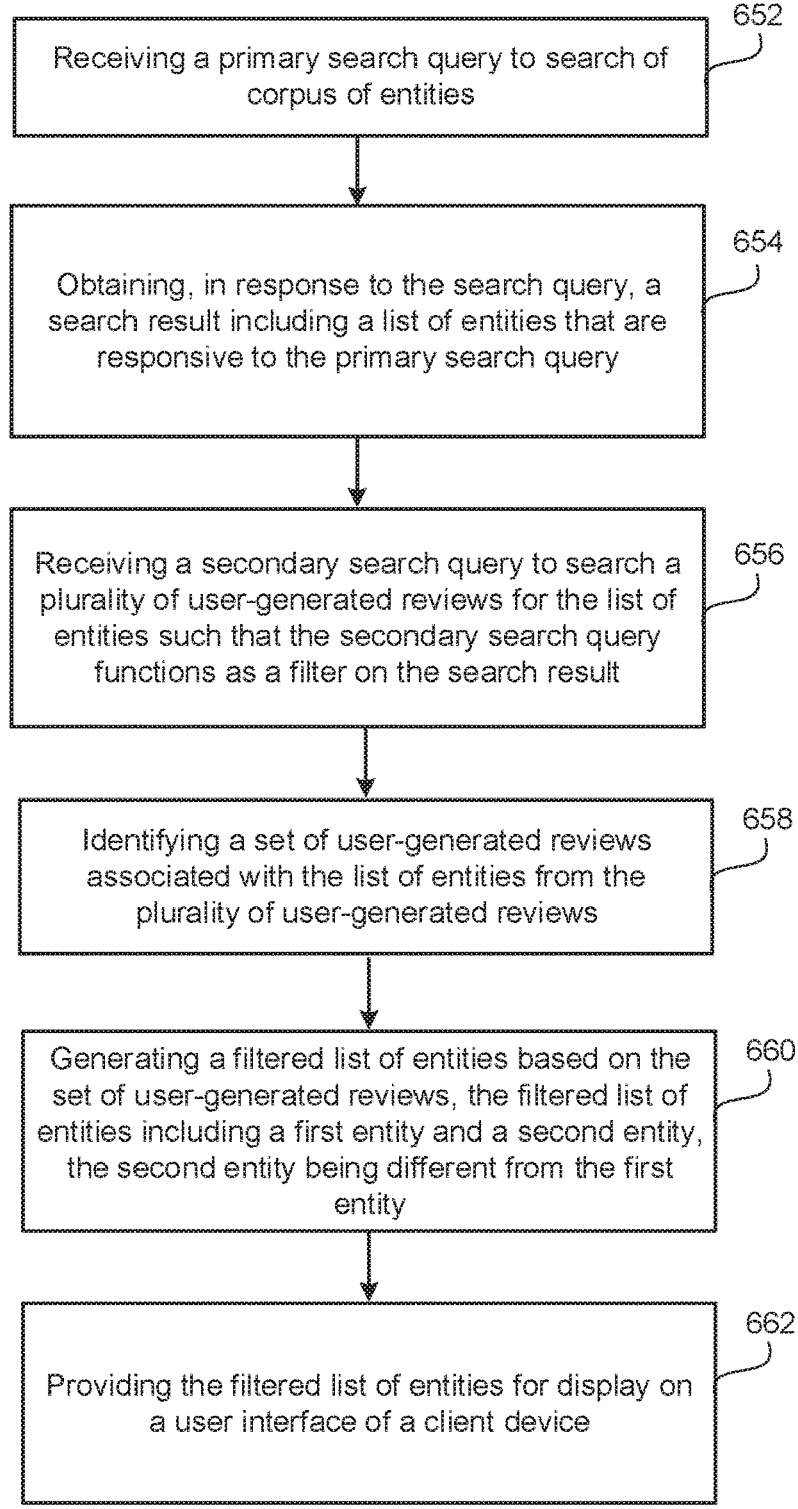
FIG. 6B illustrates a flowchart depicting example operations for searching within user-generated reviews according to another aspect.

FIG. 6B illustrates a flowchart 650 depicting example operation of a search system according to an aspect. Although the flowchart 650 of FIG. 6B illustrates the operations in sequential order, it will be appreciated that this is merely an example, and that additional or alternative operations may be included. Further, operations of FIG. 6B and related operations may be executed in a different order than that shown, or in a parallel or overlapping fashion. In some examples, the operations of the flowchart 650 may be combined with one or more of the operations of the flowchart 500 of FIG. 5, the flowchart 600 of FIG. 6A, and/or the flowchart 700 of FIG. 7. Although the flowchart 650 is described with reference to the search system of FIGS. 1A through 1H, the flowchart 650 may be applicable to any of the embodiments discussed herein. The flowchart 650 relates to generating a filtered list 123 of entities 128 based on searching within user-generated reviews 126.

A user may search a corpus of entities 128 (e.g., a product catalog, a service product catalog, webpages, etc.) to obtain a list 121 of entities 128 that are responsive to a search query 108A. For example, a user may search a database of products for "display monitor" and then receive a list 121 of display monitors, or the user may perform a web search for "hotels in Milwaukee" and then receive a list 121 of different hotels in Milwaukee. In some implementations, the query may just be a location, e.g., "Milwaukee" because the index being searched only includes hotels. In some examples, the user is able to filter the search result 120A of the search query 108A based on keyword searching within the user-generated reviews 126 to obtain a search result 120B, where the search result 120B includes a filtered list 123 of entities 128. For example, the user can submit a secondary query (e.g., the search query 108B) to search for "bed bugs" within the user-generated reviews 126 across the list 121 of hotels (which was the result of the primary search query (e.g., search query 108A)), and then receive a filtered list 123 whose user-generated reviews 126 are responsive to the search criteria "bed bugs." In some examples, the filtered list 123 is populated on a comparison layout 162 along with snippets of the relevant portions of the user-generated reviews 126.

Operation 652 includes receiving a primary search query (e.g., search query 108A) to search the corpus of entities 128. Operation 654 includes obtaining, in response to the primary search query, a search result 120A including a list 121 of entities 128 that are responsive to the primary search query. Operation 656 includes receiving a secondary search query (e.g., search query 108B) to search a plurality of user-generated reviews 126 for the list 121 of entities 128 such that the secondary search query functions as a filter on the search result 120A. Operation 658 includes identifying a set of user-generated reviews 126 associated with the list 121 of entities 128 from the plurality of user-generated reviews 126. Operation 660 includes generating a filtered list 123 of entities 128 based on the set of user-generated reviews 126, where the filtered list 123 of entities 128 includes a first entity 128-1 and a second entity 128-2. The second entity 128-2 is different from the first entity 128-1. Operation 662 includes providing the filtered list 123 of entities 128 for display on a user interface 160 of a client device 152.

Figure 7:
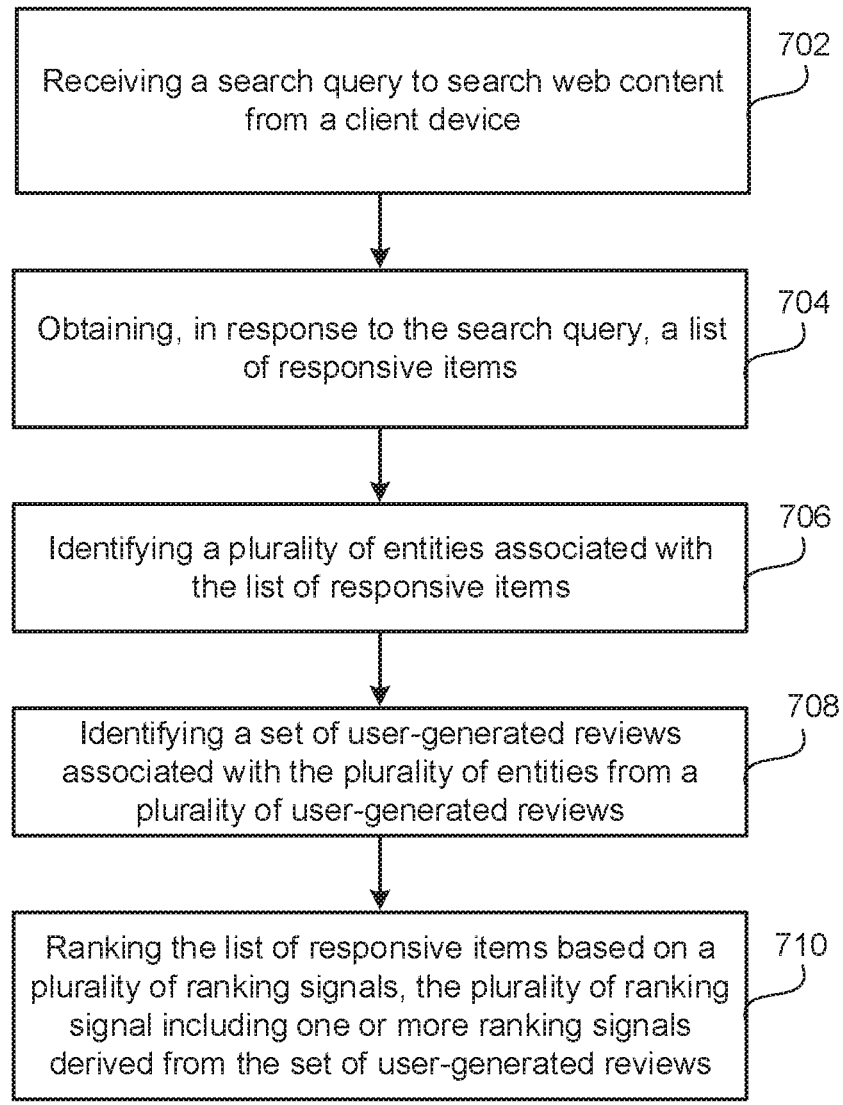
FIG. 7 illustrates a flowchart depicting example operations for ranking web items using user-generated reviews according to an aspect.

FIG. 7 illustrates a flowchart 700 depicting example operation of a search system according to an aspect. Although the flowchart 700 of FIG. 7 illustrates the operations in sequential order, it will be appreciated that this is merely an example, and that additional or alternative operations may be included. Further, operations of FIG. 7 and related operations may be executed in a different order than that shown, or in a parallel or overlapping fashion. In some examples, the operations of the flowchart 700 may be combined with one or more of the operations of the flowchart 500 of FIG. 5, the flowchart 600 of FIG. 6A, and/or the flowchart 650 of FIG. 6B. Although the flowchart 700 is described with reference to the search system 400 of FIG. 4, the flowchart 700 may be applicable to any of the embodiments discussed herein. The flowchart 700 describes operations that enable searching web pages and generating a search result to be displayed as a ranked list 485 of web items on a user interface 460 of a search application 456 of a client device 452 in which one or more of the ranking signals are derived from the user-generated reviews 426 according to an aspect.

For example, the query engine 478 may identify the entities associated with the responsive items. Then, the query engine 478 or the search engine 410 may obtain the user-generated reviews 426 associated with the identified entities. The query system 476 or the search engine 410 may derive one or more ranking signals based on the user-generated reviews 426. For example, the query system 476 or the search engine 410 may obtain rating scores associated with the relevant user-generated reviews and/or analyze the content of the user-generated reviews 426 to provide a signal indicating a level of user impression of the underlying entity. In addition, the ranking signals related to the user-generated reviews 426 may include signals related to helpfulness, review quality, review length, and/or the time associated when the user-generated reviews 426 were posted. Based on the ranking signal(s) associated with the user-generated reviews 426 (in conjunction with other types of ranking signals), the query engine 478 may rank the list of web items to generate the ranked list 485.

Operation 702 includes receiving a search query to search web content from a client device 452. For example, a user may enter text into a search box of a search application 456 to search for content on the internet. The query system 476 (e.g., the query engine 478) may receive the search query over the network 450 from the client device 452.

Operation 704 includes obtaining, in response to the search query, a list of responsive items. For example, the query system 476 may search one or more indices, represented collectively as item index 486. The item index 486 may include a web document index, e.g., an inverted index that associates terms, phrases, and/or n-grams with web documents. The query engine 478 may obtain responsive items from the item index 486.

Operation 706 includes identifying a plurality of entities associated with the list of responsive items. For example, the query engine 478 may identify the entities associated with the responsive items. If the list of responsive items identifies a first hotel, a second hotel, and a third hotel, the query engine 478 may identify the first hotel, the second hotel, and the third hotel as the entities associated with the responsive items.

Operation 708 includes identifying a set of user-generated reviews associated with the plurality of entities from a plurality of user-generated reviews. The query engine 478 or the search engine 410 may obtain the user-generated reviews associated with the identified entities. For example, the query engine 478 or the search engine 410 may search the review index 118 of FIG. 1A using the identified entities as search criteria to obtain the user-generated reviews that correspond to the identified entities.

Operation 710 includes ranking the list of responsive items based on a plurality of ranking signals, where the plurality of ranking signals include one or more ranking signals derived from the set of user-generated reviews 426. For example, the query system 476 or the search engine 410 may derive one or more ranking signals based on the user-generated reviews 426. For example, the query system 476 or the search engine 410 may obtain rating scores associated with the relevant user-generated reviews and/or analyze the content of the user-generated reviews to provide a signal indicating a level of user impression of the underlying entity. In addition, the ranking signals related to the user-generated reviews 426 may include signals related to helpfulness, review quality, review length, and/or the time associated when the user-generated reviews 426 were posted. Based on the ranking signal(s) associated with the user-generated reviews 426 (in conjunction with other types of ranking signals), the query engine 478 may rank the list of web items to generate the ranked list 485.

FIG. 8 shows an example of a generic computer device 800, which may be operated as a search engine 102 of FIGS. 1A through 1H, a client device 152 of FIGS. 1A through 1H, a search engine 470 of FIG. 4, a search engine 410 of FIG. 4, and/or a client device 452 of FIG. 4, which may be used with the techniques described here. Computing device 800 is intended to represent various example forms of computing devices, such as laptops, desktops, workstations, personal digital assistants, cellular telephones, smartphones, tablets, televisions, servers, and other computing devices, including wearable devices. The components shown here, their connections and relationships, and their functions, are meant to be examples only, and are not meant to limit implementations of the inventions described and/or claimed in this document.

Computing device 800 includes a processor 802, memory 804, a storage device 806, and expansion ports 810 connected via an interface 808. In some implementations, computing device 800 may include transceiver 846, communication interface 844, and a GPS (Global Positioning System) receiver module 848, among other components, such as a camera or cameras, touch sensors, keyboards, etc., connected via interface 808. Device 800 may communicate wirelessly through communication interface 844, which may include digital signal processing circuitry where necessary. Each of the components 802, 804, 806, 808, 810, 840, 844, 846, and 848 may be mounted on a common motherboard or in other manners as appropriate.

The processor 802 can process instructions for execution within the computing device 800, including instructions stored in the memory 804 or on the storage device 806 to display graphical information for a GUI on an external input/output device, such as display 816. Display 816 may be a monitor or a flat touchscreen display. In some implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk. In some implementations, the memory 804 may include expansion memory provided through an expansion interface.

The storage device 806 is capable of providing mass storage for the computing device 800. In one implementation, the storage device 806 may be or include a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also include instructions that, when executed, perform one or more methods, such as those described above. The computer- or machine-readable medium is a storage device such as the memory 804, the storage device 806, or memory on processor 802.

The interface 808 may be a high speed controller that manages bandwidth-intensive operations for the computing device 800 or a low speed controller that manages lower bandwidth-intensive operations, or a combination of such controllers. An external interface 840 may be provided so as to enable near area communication of device 800 with other devices. In some implementations, controller 808 may be coupled to storage device 806 and expansion port 814. The expansion port, which may include various communication ports (e.g., USB, Bluetooth, Ethernet, wireless Ethernet) may be coupled to one or more input/output devices, such as a keyboard, a pointing device, a scanner, a camera or cameras, or a networking device such as a switch or router, e.g., through a network adapter.

The computing device 800 may be implemented in a number of different forms, as shown in the figure. For example, it may be implemented as a standard server 830, or multiple times in a group of such servers. It may also be implemented as part of a rack server system. In addition, it may be implemented in a computing device, such as a laptop computer 832, personal computer 834, or tablet/smartphone 836. An entire system may be made up of multiple computing devices 800 communicating with each other. Other configurations are possible.

FIG. 9 shows an example of a generic computer device 900, which may be a search engine 102 of FIGS. 1A through 1H and/or a search engine 470 of FIG. 4, which may be used with the techniques described here. Computing device 900 is intended to represent various example forms of large-scale data processing devices, such as servers, blade servers, datacenters, mainframes, and other large-scale computing devices. Computing device 900 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 900 may include any number of computing devices 980. Computing devices 980 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 980*a* includes multiple racks 958*a*-958*n*. Each rack may include one or more processors, such as processors 952*a*-952*n* and 962*a*-962*n*. The processors may include data processors, network attached storage devices, and other computer controlled devices. In some implementations, one processor may operate as a master processor and control the scheduling and data distribution tasks. Processors may be interconnected through one or more rack switches 958, and one or more racks may be connected through switch 978. Switch 978 may handle communications between multiple connected computing devices 900.

Each rack may include memory, such as memory 954 and memory 964, and storage, such as 956 and 966. Storage 956 and 966 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 956 or 966 may be shared between multiple processors, multiple racks, or multiple computing devices and may include a computer-readable medium storing instructions executable by one or more of the processors. Memory 954 and 964 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 954 may also be shared between processors 952*a*-952*n*. Data structures, such as an index, may be stored, for example, across storage 956 and memory 954. Computing device 900 may include other components not shown, such as controllers, buses, input/output devices, communications modules, etc.

An entire system may be made up of multiple computing devices 900 communicating with each other. For example, device 980*a* may communicate with devices 980*b*, 980*c*, and 980*d*, and these may collectively be known as the search engine 102 of FIGS. 1A through 1H and/or the search engine 470 of FIG. 4. As another example, the search engine 102 of FIGS. 1A through 1H and/or the search engine 470 of FIG. 4 may include two or more computing devices 900. Some of the computing devices may be located geographically close to each other, and others may be located geographically distant. The layout of system 900 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method for searching within user-generated reviews for multiple entities, the method comprising:
    receiving, from a client device, a search query to search within a plurality of user-generated reviews relating to a plurality of entities, the plurality of user-generated reviews being stored as a corpus of documents that are indexed and searchable;
    searching, in response to the search query, an inverted index that associates at least one of terms, phrases, or n-grams with the documents to identify, a set of user-generated reviews from the plurality of user-generated reviews that correspond to one or more search terms of the search query, the set of user-generated reviews including a user-generated review for a first entity and a user-generated review for a second entity, the first entity being different than the second entity;
    obtaining a first textual snippet including textual content from the user-generated review for the first entity, the first textual snippet highlighting the one or more search terms of the search query;
    obtaining a second textual snippet including textual content from the user-generated review for the second entity, the second textual snippet highlighting the one or more search terms of the search query; and
    providing at least the first textual snippet and the second textual snippet for simultaneous display on a comparison layout of a user interface of the client device.

2. The method of claim 1 further comprising:
    providing entire textual contents of the user-generated review for the first entity in response to receipt of a user-provided action taken with respect to the first textual snippet.

3. The method of claim 1, further comprising:
    generating a list of entities based on each entity's user-generated reviews relevance to the one or more search terms; and
    providing portions of the user-generated reviews for the list of entities in the comparison layout on the user interface of the client device.

4. The method of claim 1, wherein the search query is a first search query, the method further comprising:
    receiving a second search query to search the plurality of user-generated reviews, the second search query including one or more search terms different from the one or more search terms of the search query;
    obtaining, in response to the second search query, a new set of user-generated reviews from the plurality of user-generated reviews that correspond to the one or more search terms of the second search query, the new set of user-generated reviews including reviews about new entities; and
    providing portions of the new set of user-generated reviews on the user interface such that the comparison layout is repopulated with the new entities along with portions from the new set of user-generated reviews that correspond to the one or more search terms of the second search query.

5. The method of claim 1, further comprising:
    receiving user-provided action taken with respect to a selectable keyword included within the user-generated review for the first entity;
    obtaining a new set of user-generated reviews from the plurality of user-generated reviews that correspond to the selectable keyword, the new set of user-generated reviews including reviews about new entities; and
    providing portions of the new set of user-generated reviews on the user interface such that the comparison layout is repopulated with the new entities along with portions of the new set of user-generated reviews that correspond to the selectable keyword.

6. The method of claim 1, further comprising:
    receiving a user-provided action taken with respect to the second entity to remove the second entity from the comparison layout;
    identifying, in response to receiving the user-provided action, a third entity as a suggested option; and
    providing, in replacement of the second entity, at least a portion of a user-generated review for the third entity as the suggested option for display on the comparison layout.

7. The method of claim 1, further comprising:
    ranking the set of user-generated reviews based on occurrence of the one or more search terms within the set of user-generated reviews and at least one other signal derived from the set of user-generated reviews.

8. The method of claim 7, wherein the at least one other signal includes review quality, review length, or a time in which a respective user-generated review was posted.

9. The method of claim 1, wherein the comparison layout includes a first column that corresponds to the first entity and a second column that corresponds to the second entity, the first column being populated with user-generated reviews about the first entity that meet the one or more search terms of the search query, the second column being populated with user-generated reviews about the second entity that meet the one or more search terms of the search query.

10. The method of claim 1, further comprising:
ranking the set of user-generated reviews based on occurrence of the one or more search terms within the set of user-generated reviews and at least one other signal derived from the set of user-generated reviews, the at least one other signal including a quality of a respective user-generated review.

11. The method of claim 1, further comprising:
receiving a new user-generated review posted by a user to an online platform, the new user-generated review being accessible via a network;
searching, by a web crawler, for the new user-generated review to obtain content about the new user-generated review; and
updating, by an indexing engine, the inverted index to add the new user-generated review using the content about the new user-generated review.

12. A method for searching within a plurality of user-generated reviews for multiple entities, the method comprising:
receiving, from a client device, a search query to search within the plurality of user-generated reviews relating to a plurality of entities, the plurality of user-generated reviews being stored as a corpus of documents that are indexed and searchable;
searching, in response to the search query, an inverted index associated with at least one of terms, phrases, or n-grams with the documents to identify, a set of user-generated reviews from the plurality of user-generated reviews that correspond to one or more search terms of the search query;
generating a list of entities based on the set of user-generated reviews, the list of entities including a first entity and a second entity, the second entity being different from the first entity;
providing the list of entities for display on a user interface of the client device; and
ranking the list of entities based on each entity's user-generated reviews relevance to the one or more search terms included within the search query.

13. The method of claim 12, wherein the search query is a filter on a search of entities.

14. The method of claim 12, wherein the list of entities are ranked based on at least one other signal derived from the set of user-generated reviews.

15. The method of claim 12, wherein the set of user-generated reviews includes first user-generated reviews for the first entity and second user-generated reviews for the second entity, wherein the method further includes:
providing snippets of the first user-generated reviews and for the second user-generated reviews for simultaneous display on a comparison layout of the user interface of the client device.

16. The method of claim 15, further comprising:
receiving a user-provided action taken with respect to a selectable keyword included within one of the snippets;
obtaining a new set of user-generated reviews from the plurality of user-generated reviews that correspond to the selectable keyword, the new set of user-generated reviews including reviews about a new list of entities; and
providing snippets of the new set of user-generated reviews on the user interface such that the comparison layout is updated with the new list of entities along with the snippets of the new set of user-generated reviews that correspond to the selectable keyword.

17. The method of claim 12, further comprising:
displaying a location of the first entity and a location of the second entity on an interactive map;
displaying an indication of at least one first user-generated review in a location within a first threshold distance from the location of the first entity; and
displaying an indication of at least one second user-generated review in a location within a second threshold distance from the location of the second entity.

18. The method of claim 12, further comprising:
ranking the set of user-generated reviews based on occurrence of the one or more search terms within the set of user-generated reviews and at least one other signal derived from the set of user-generated reviews, wherein the at least one other signal includes review quality, review length, or a time in which a respective user-generated review was posted.

19. A method for searching within user-generated reviews for multiple entities, the method comprising:
receiving a primary search query to search of corpus of entities;
obtaining, in response to the primary search query, a search result including a list of entities that are responsive to the primary search query;
receiving a secondary search query to search a plurality of user-generated reviews for the list of entities such that the secondary search query functions as a filter on the search result, the secondary search query including one or more search terms entered by a user, the plurality of user-generated reviews being stored as a corpus of documents that are indexed and searchable;
searching, in response to the secondary search query, an inverted index that associates at least one of terms, phrases, or n-grams with the documents to identify a set of user-generated reviews associated with the list of entities from the plurality of user-generated reviews;
ranking the list of entities based on each entity's user-generated reviews relevance to the one or more search terms included within the secondary search query to generate a ranked list of entities; and
providing the ranked list of entities for display on a user interface of a client device.

20. The method of claim 19, further comprising:
providing a comparison layout of a user interface of a client device, the comparison layout includes a first column that corresponds to a first entity of the list of entities and a second column that corresponds to a second entity of the list of entities, the first column being populated with first user-generated reviews about the first entity that meet the one or more search terms of the secondary search query, the second column being populated with second user-generated reviews about the second entity that meet the one or more search terms of the secondary search query.

21. The method of claim 20, further comprising:
providing first textual snippets of the first user-generated reviews and second textual snippets for the second user-generated reviews for simultaneous display on the comparison layout.

22. The method of claim 21, further comprising:
receiving a user-provided action taken with respect to a selectable keyword included within one of the first textual snippets;
obtaining a new set of user-generated reviews from the plurality of user-generated reviews that correspond to the selectable keyword, the new set of user-generated reviews including reviews about a new list of entities; and providing textual snippets of the new set of user-generated reviews on the user interface such that the comparison layout is updated with the new list of entities along with the textual snippets of the new set of user-generated reviews that correspond to the selectable keyword.

* * * * *